United States Patent
Fujihara et al.

(10) Patent No.: US 9,708,131 B2
(45) Date of Patent: Jul. 18, 2017

(54) ARTICLE SORTING APPARATUS

(71) Applicant: Kabushiki Kaisha Toshiba, Minato-ku (JP)

(72) Inventors: Hiroaki Fujihara, Kawasaki (JP); Yusuke Mitsuya, Yokohama (JP); Osamu Maruyama, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/254,338

(22) Filed: Sep. 1, 2016

(65) Prior Publication Data
US 2017/0057751 A1   Mar. 2, 2017

(30) Foreign Application Priority Data

Sep. 2, 2015  (JP) .................................. 2015-173255

(51) Int. Cl.
*B65G 47/22*   (2006.01)
*B65G 47/53*   (2006.01)
(Continued)

(52) U.S. Cl.
CPC ............. *B65G 47/22* (2013.01); *B65G 17/12* (2013.01); *B65G 17/345* (2013.01); *B65G 43/00* (2013.01);
(Continued)

(58) Field of Classification Search
CPC ......... B65G 47/22; B65G 47/52; B65G 47/53
See application file for complete search history.

(56) References Cited

U.S. PATENT DOCUMENTS

| 4,295,559 A | 10/1981 | Neal et al. |
| 4,723,650 A | 2/1988 | Hartmann et al. |

(Continued)

FOREIGN PATENT DOCUMENTS

| DE | 197 43 423 A1 | 4/1999 |
| EP | 0 927 689 A1 | 7/1999 |

(Continued)

OTHER PUBLICATIONS

U.S. Appl. No. 14/820,007, filed Aug. 6, 2015, Hiroaki Fujihara et al.

(Continued)

*Primary Examiner* — Thomas Randazzo
(74) *Attorney, Agent, or Firm* — Oblon, McClelland, Maier & Neustadt, L.L.P.

(57) ABSTRACT

An article sorting apparatus includes a conveyance path, a conveyor cell, a loading device, a positioning device, a sorting unit and a control device. The conveyor cell moves along the conveyance path in a first conveyance direction and conveys an article loaded thereon in a second conveyance direction that intersects the first conveyance direction. The loading device loads the article onto the conveyor cell. The positioning device is located opposite the loading device with respect to the conveyance path. The positioning device includes a contact member and a driving unit. The driving unit drives the contact member in the second conveyance direction and brings it into contact with the article loaded onto the conveyor cell. The sorting unit receives the article conveyed by the conveyor cell. The control device controls conveyance of the article in the second conveyance direction. The control device controls the driving unit of the positioning device.

11 Claims, 17 Drawing Sheets

(51) Int. Cl.
*B65G 43/00* (2006.01)
*B65G 17/12* (2006.01)
*B65G 17/34* (2006.01)
*B65G 47/52* (2006.01)
*B65G 47/88* (2006.01)
*B65G 54/02* (2006.01)
*B65G 43/08* (2006.01)
*B65G 47/82* (2006.01)

(52) U.S. Cl.
CPC ............ *B65G 43/08* (2013.01); *B65G 47/52* (2013.01); *B65G 47/53* (2013.01); *B65G 47/82* (2013.01); *B65G 47/8807* (2013.01); *B65G 54/02* (2013.01); *B65G 2203/0233* (2013.01); *B65G 2205/00* (2013.01)

(56) References Cited

U.S. PATENT DOCUMENTS

| | | | | |
|---|---|---|---|---|
| 5,588,520 | A * | 12/1996 | Affaticati | B61B 13/08 198/370.06 |
| 8,616,361 | B1 | 12/2013 | Shankarbabu et al. | |
| 9,452,893 | B1 * | 9/2016 | Fujihara | B65G 43/08 |
| 9,511,949 | B2 * | 12/2016 | Fujihara | B65G 17/345 |
| 2002/0017537 | A1 * | 2/2002 | Barklin | B65G 17/345 222/240 |
| 2003/0221935 | A1 * | 12/2003 | Barklin | B65G 17/345 198/357 |
| 2005/0220580 | A1 * | 10/2005 | Arnold | B07C 3/008 414/414 |
| 2014/0076689 | A1 * | 3/2014 | Kim | B65G 47/71 198/370.03 |
| 2015/0239015 | A1 * | 8/2015 | Asari | B65G 47/68 209/606 |
| 2016/0052722 | A1 | 2/2016 | Fujihara et al. | |
| 2016/0297619 | A1 * | 10/2016 | Hahn | B65G 47/082 |

FOREIGN PATENT DOCUMENTS

| | | |
|---|---|---|
| GB | 2 137 951 A | 10/1984 |
| JP | 60-232313 A | 11/1985 |
| JP | 7-30580 | 7/1995 |

OTHER PUBLICATIONS

U.S. Appl. No. 15/057,266, filed Mar. 1, 2016, Hiroaki Fujihara et al.

Extended European Search Report issued Feb. 6, 2017 in Patent Application No. 16186298.2.

* cited by examiner

ARTICLE SORTING APPARATUS

CROSS-REFERENCE TO RELATED APPLICATION

This application is based upon and claims the benefit of priority from the prior Japanese Patent Application No. 2015-173255, filed on Sep. 2, 2015, the entire contents of which are incorporated herein by reference.

FIELD

An exemplary embodiment described herein relates to an article sorting apparatus.

BACKGROUND

Conventionally, there are cross belt sorters that convey a plurality of cells on a conveyance path, and transfer articles in a direction orthogonal to a conveyance direction using a belt mechanism that is provided in each of the plurality of cells. Such a cross belt sorter conveys the cells, in each of which an article is loaded on a belt of the belt mechanism thereof. When a cell is adjacent to a chute that corresponds to the sorting destination of an article on the cell, the belt of the cell is driven to transfer the articles to chutes. However, when loading an article from an injector onto the belt of a cell, there is the possibility that the position and the orientation of the article on the belt becomes unstable, depending on the center of gravity of the article, the shape of the bottom surface of the article, and the material of the article. Also, if an article on the belt topples or falls down from the belt, there is the possibility that the article is damaged. If the accuracy with which an article is positioned on the belt degrades, an additional function might be required in order to correct the loading position of an article by driving the belt.

DETAILED DESCRIPTION

An article sorting apparatus according to an embodiment includes a conveyance path, a conveyor cell, a loading device, a positioning device, a sorting unit, and a control device. The conveyor cell moves along the conveyance path in a first conveyance direction. The conveyor cell conveys an article loaded thereon in a second conveyance direction that intersects the first conveyance direction. The loading device loads the article onto the conveyor cell. The positioning device is located opposite the loading device with respect to the conveyance path. The positioning device includes a contact member and a driving unit. The contact member is brought into contact with the article loaded onto the conveyor cell by the loading device. A contact portion of the contact member, which is in contact with the article, moves in synchronization with the movement of the article in the first conveyance direction. The driving unit drives the contact member in the second conveyance direction. The sorting unit receives the article conveyed by the conveyor cell. The control device controls conveyance of the article in the second conveyance direction by the conveyor cell when the loading device has loaded the article onto the conveyor cell. The control device brings the contact member into contact with the article loaded onto the conveyor cell by driving the contact member in the second conveyance direction, using the driving unit.

The article sorting apparatus according to the embodiment is capable of stabilizing the position and the orientation of an article when the article is loaded onto a conveyor cell.

The following describes an article sorting apparatus according to an embodiment with reference to the drawings.

Figure 1:
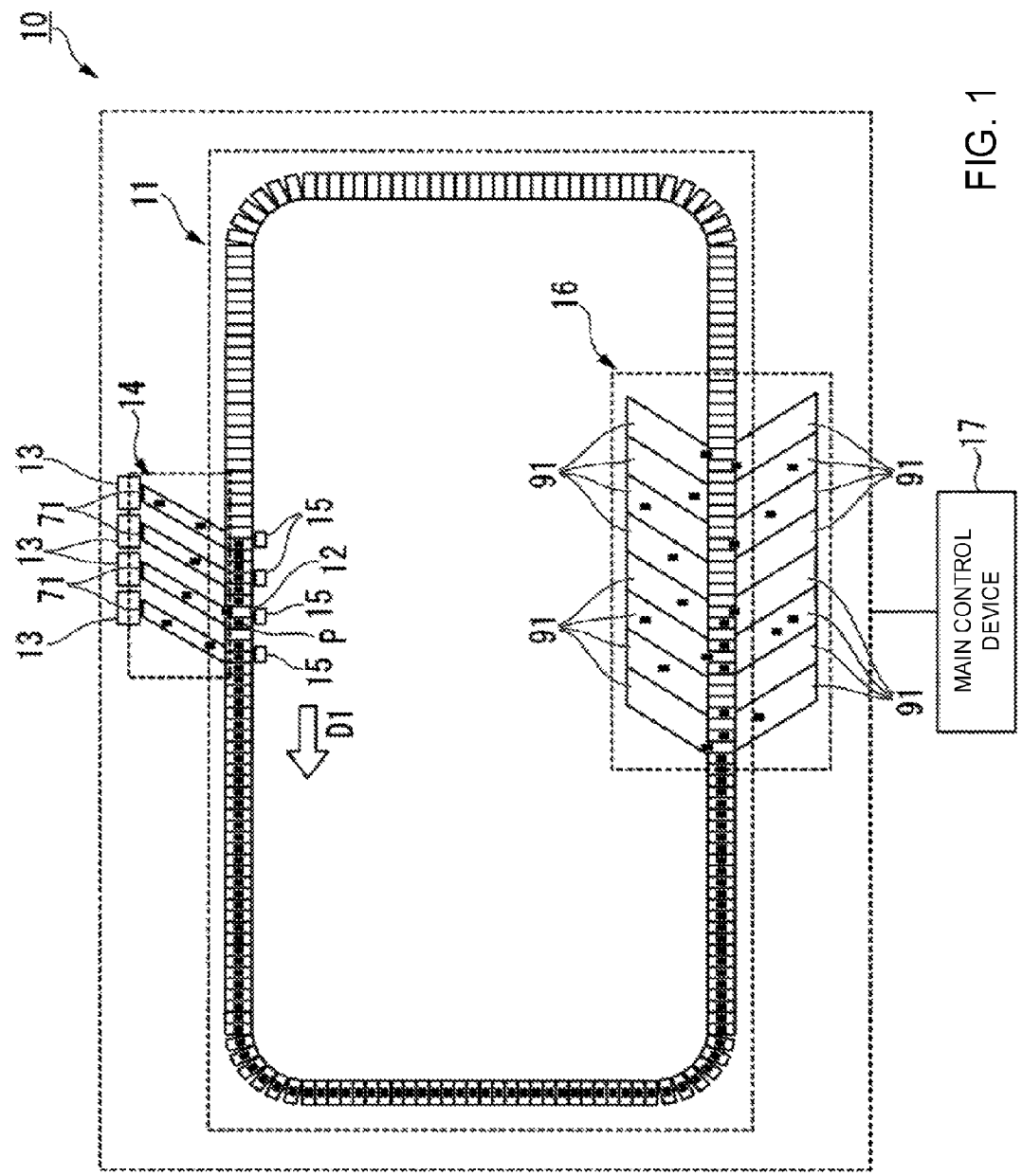
FIG. 1 is a plan view schematically showing a configuration of an article sorting apparatus according to an embodiment.

As shown in FIG. 1, an article sorting apparatus 10 according to an embodiment is provided with: a conveyance path 11; conveyor cells 12; information obtaining units 13; a loading device 14, positioning devices 15, and a sorting unit 16, which are arranged along the conveyance path 11; and a main control device 17.

The conveyance path 11 is formed as a circulation (cyclic) route that guides each of the plurality of conveyor cells 12. The conveyance path 11 guides the conveyor cells 12 to the loading device 14, to the corresponding positioning devices 15, to the corresponding information obtaining unit 13, and to the sorting unit 16, sequentially, in a first conveyance direction D1 (i.e., counterclockwise conveyance direction shown in FIG. 1) along the circulation (cyclic) route.

Figure 2:
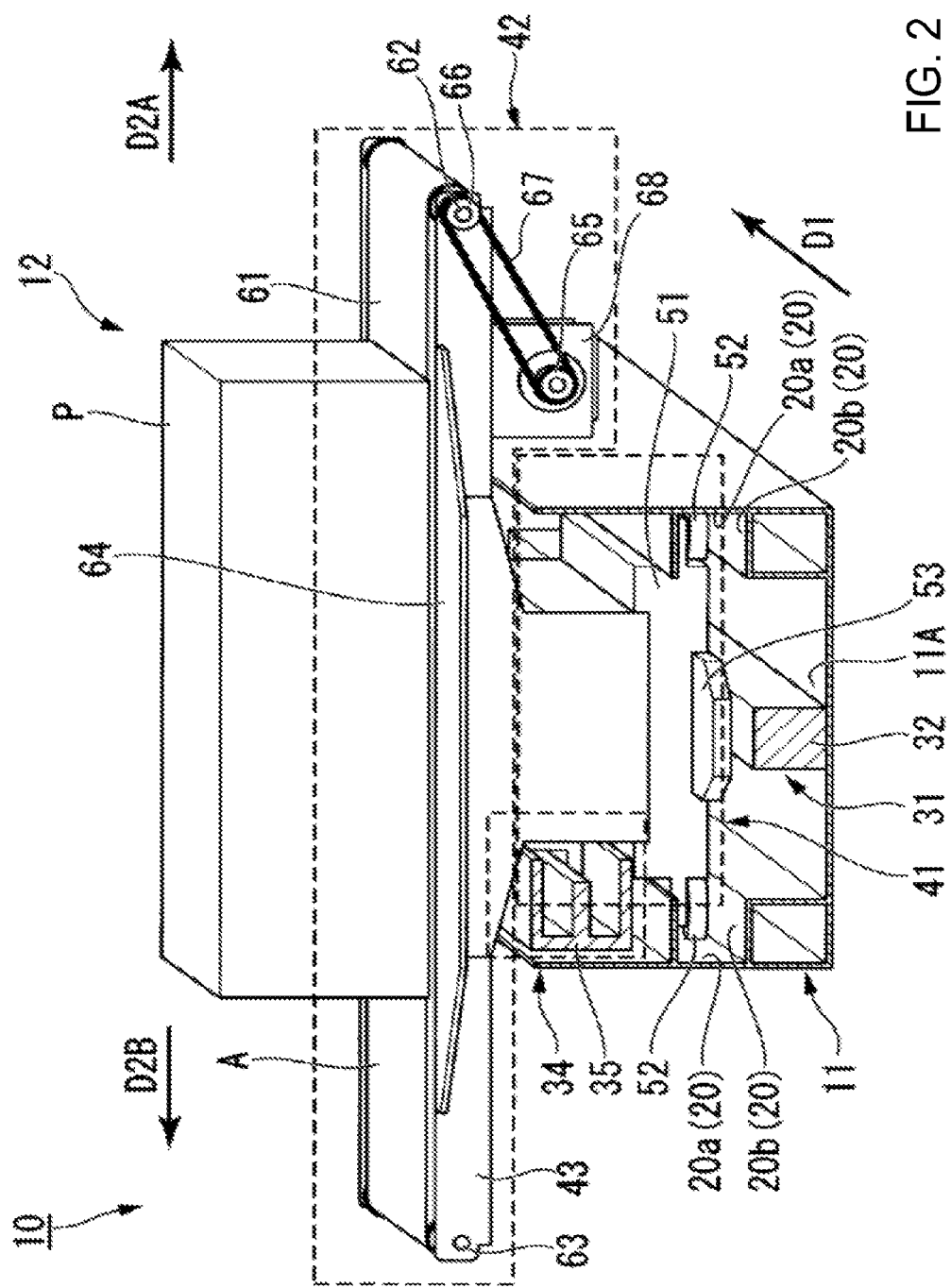
FIG. 2 is a perspective view schematically showing a configuration of a conveyor cell of the article sorting apparatus according to the embodiment.
Figure 3:
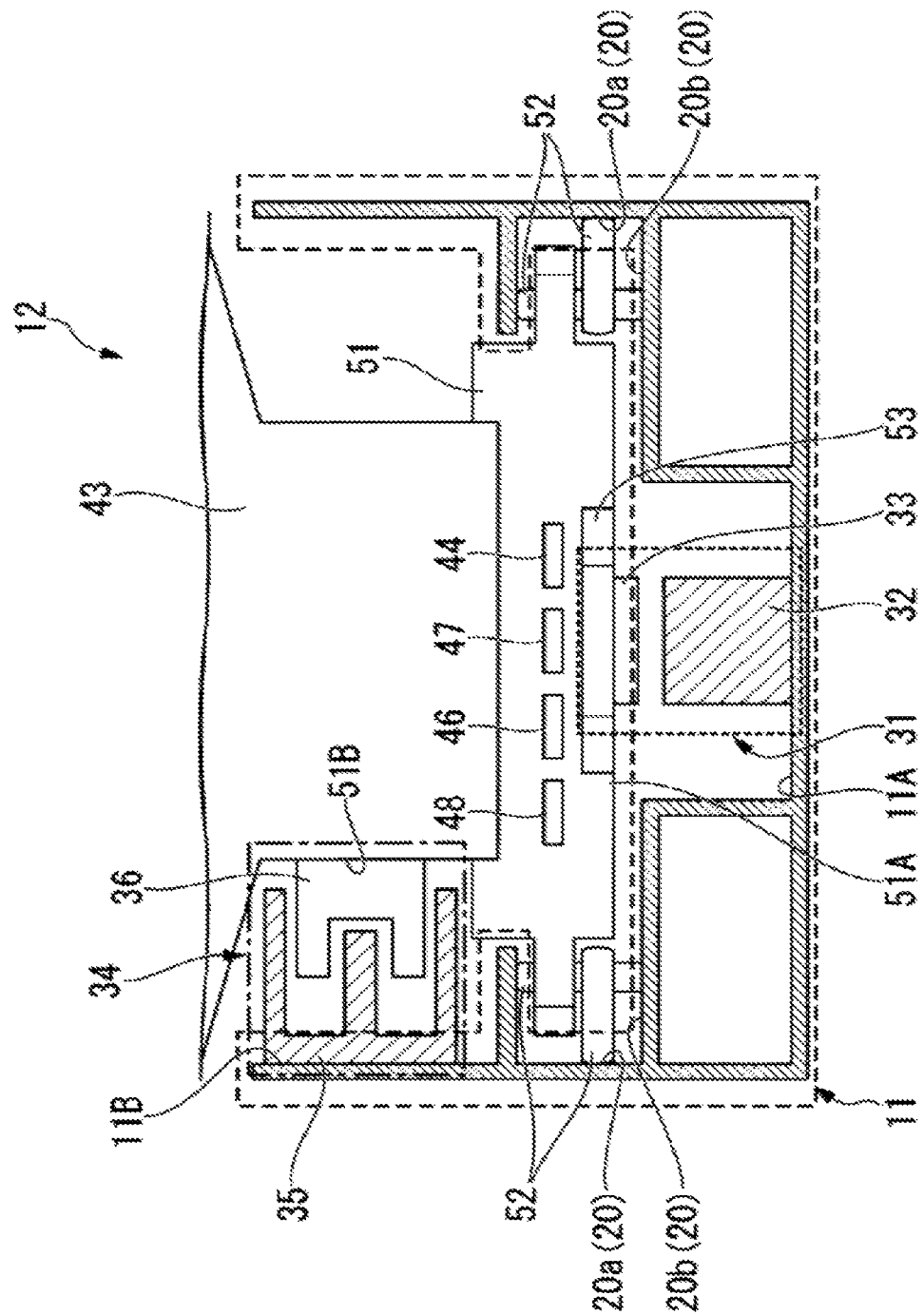
FIG. 3 is a cross-sectional view schematically showing a configuration of a portion of a conveyor cell of the article sorting apparatus according to the embodiment.

As shown in FIGS. 2 and 3, the conveyance path 11 is provided with guide walls 20 (e.g., a first guide wall 20a and a second guide wall 20b) that are brought into contact with guide rollers 52 of the conveyor cells 12, which will be described later, and that thus guide the guide rollers 52.

The conveyance path 11 and the plurality of conveyor cells 12 are provided with a linear synchronous motor 31 that drives the conveyor cells 12 along the conveyance path 11. The linear synchronous motor 31 is provided with, for example, an electromagnetic coil 32 that is provided along the entire length of the conveyance path 11 and that serves as a stator, and a permanent magnet array 33 that is provided in the plurality of conveyor cells 12 and that serves as a mover. In the linear synchronous motor 31, the permanent magnet array 33 generates driving force (conveying force) in the first conveyance direction D1, using electric current flowing through the electromagnetic coil 32. The state of electric current flowing through the electromagnetic coil 32 is controlled by the main control device 17, and thus the linear synchronous motor 31 conveys the conveyor cells 12 at any desired speed and acceleration by using conveying force acting on the permanent magnet array 33.

The conveyance path 11 and the plurality of conveyor cells 12 are provided with a contactless power feeder unit 34 that feeds power from the conveyance path 11 to the corresponding conveyor cell 12. The contactless power feeder unit 34 is provided with, for example, a primary coil 35 that is provided along the entire length of the conveyance path 11, and a secondary coil 36 that is provided in the corresponding conveyor cell 12. The contactless power feeder unit 34 feeds power from the conveyance path 11 to the corresponding conveyor cell 12 by electromagnetic induction between the primary coil 35 and the secondary coil 36.

The plurality of conveyor cells 12 that move along the conveyance path 11 are arranged in a line along the first conveyance direction D1. Conveyor cells 12 that are adjacent to each other may be coupled to each other, for example.

As shown in FIG. 2, each of the plurality of conveyor cells 12 is provided with: a chassis portion 41; a cross belt mechanism 42; and a frame portion 43 to which the chassis portion 41 and the cross belt mechanism 42 are fixed. As shown in FIG. 3, each of the plurality of conveyor cells 12 is also provided with: a battery 44; a cell communication unit 46; a cell control unit 47; and a storage unit 48.

As shown in FIG. 2 and FIG. 3, the chassis portion 41 is provided with:

a chassis 51 serving as a base for the entire conveyor cell 12; two guide rollers 52 that are supported by the chassis 51; and coupling mechanisms 53.

In the chassis 51, the permanent magnet array 33 of the linear synchronous motor 31, for example, is fixed to a lower surface 51A of the chassis 51 that faces a bottom surface 11A of the conveyance path 11. Thus, the permanent magnet array 33 faces the electromagnetic coil 32 that is provided on the bottom surface 11A of the conveyance path 11.

In the chassis 51, the secondary coil 36 of the contactless power feeder unit 34, for example, is fixed to a side surface 51B of the chassis 51 that faces an inner wall surface 11B of the conveyance path 11. Thus, the secondary coil 36 faces the primary coil 35 that is provided on the inner wall surface 11B of the conveyance path 11.

Each of the two guide rollers 52 is provided with a rotation shaft (not shown) that is supported by the chassis 51. When the conveyor cell 12 is conveyed along the conveyance path 11, each of the guide rollers 52 rotates about their rotation shaft while being brought into contact with the guide wall 20 (i.e., the first guide wall 20a and the second guide wall 20b) of the conveyance path 11. Thus, the guide rollers 52 guide the conveyor cell 12 along the guide walls 20 of the conveyance path 11.

The coupling mechanisms 53 are respectively fixed to a front portion and a rear portion of the chassis 51. The coupling mechanisms 53 of the conveyor cells 12 are coupled to the connection mechanisms 53 of adjacent conveyor cells 12 that are located on the front side or the rear side of the conveyor cell 12 in the first conveyance direction D1 such that the coupling mechanisms 53 of the conveyor cells 12 are rotatable about at least a vertical rotation shaft (not shown). Thus, a conveyor cell 12 and an adjacent conveyor cell 12 that is located on the front side or the rear side of the conveyor cell 12 in the first conveyance direction D1 are coupled to each other by their coupling mechanisms 53 without obstructing each other's operation.

As shown in FIG. 2, the cross belt mechanism 42 is fixed to the chassis portion 41 by the frame portion 43 that is made of metal, for example. The cross belt mechanism 42 conveys an article P loaded thereon in a second conveyance direction D2 (e.g., a first transfer direction D2A or a second transfer direction D2B that are opposite to each other) that is orthogonal to the first conveyance direction D1. The first transfer direction D2A is, for example, the rightward direction from the conveyor cell 12 as viewed in the first conveyance direction D1. The second transfer direction D2B is, for example, the leftward direction from the conveyor cell 12 as viewed in the first conveyance direction D1.

Figure 4:
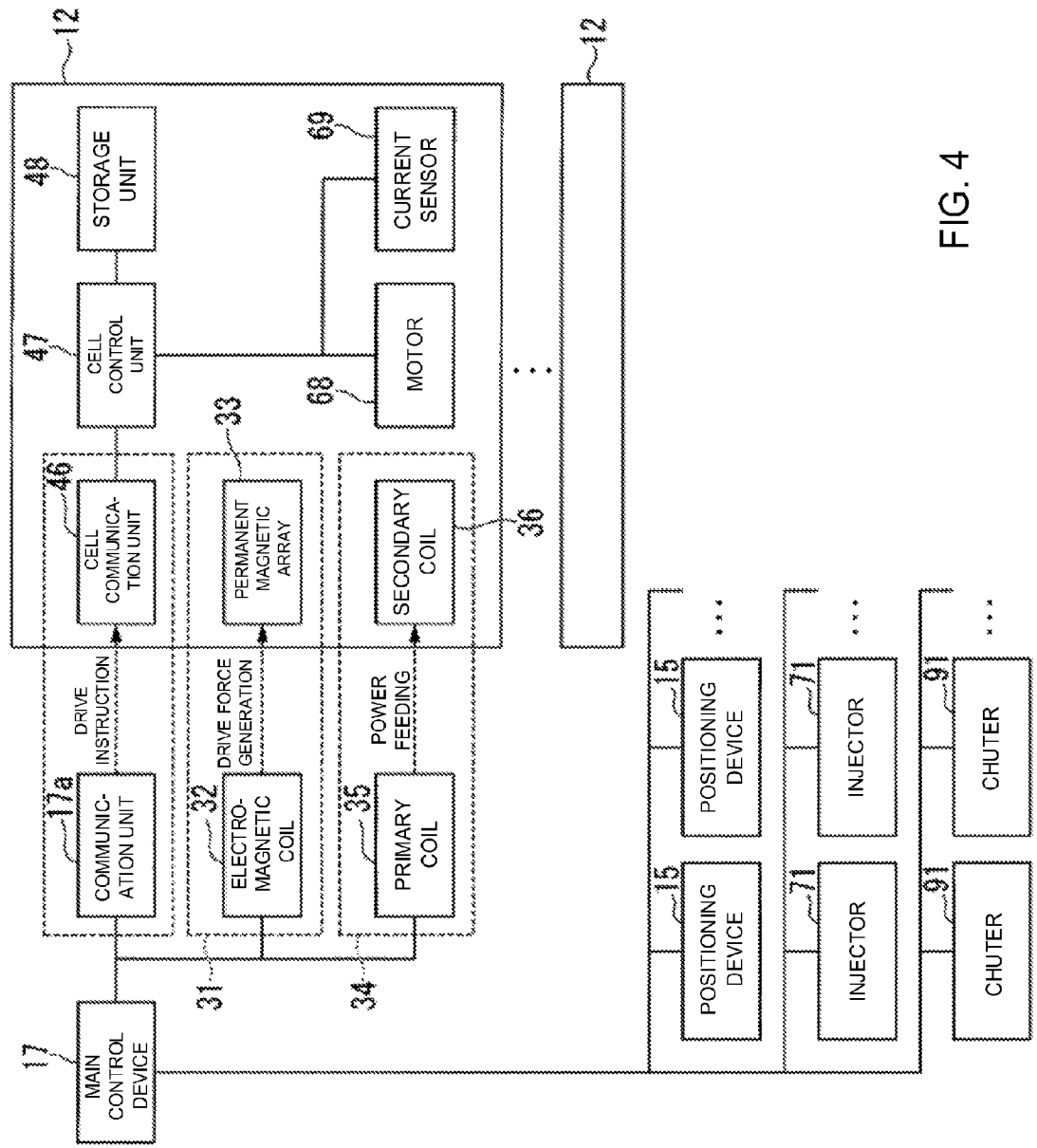
FIG. 4 is a block diagram showing a portion of a functional configuration of the article sorting apparatus according to the embodiment.

The cross belt mechanism 42 is provided with: a cross belt 61; a driving roller 62; a driven roller 63; a belt support board 64; a motor-side toothed pulley 65; a roller-side toothed pulley 66; a timing belt 67; and a motor 68. As shown in FIG. 4, the cross belt mechanism 42 is also provided with a current sensor 69.

The cross belt 61 is a tubular endless belt formed of a flat belt, for example. The surface of the cross belt 61 is coated with synthetic resin such as polyvinyl chloride, polyurethane, or synthetic rubber, for example. As shown in FIG. 2, the cross belt 61 is stretched between the driving roller 62 and the driven roller 63. The cross belt 61 is rotated by rotational driving force of the driving roller 62, thereby rotating the driven roller 63. The driving roller 62 and the driven roller 63 are arranged parallel to each other, with a predetermined distance therebetween in the left-right direction (i.e., in the first transfer direction D2A and in the second transfer direction D2B) of the conveyor cell 12 when viewed in the first conveyance direction D1.

Figure 5:
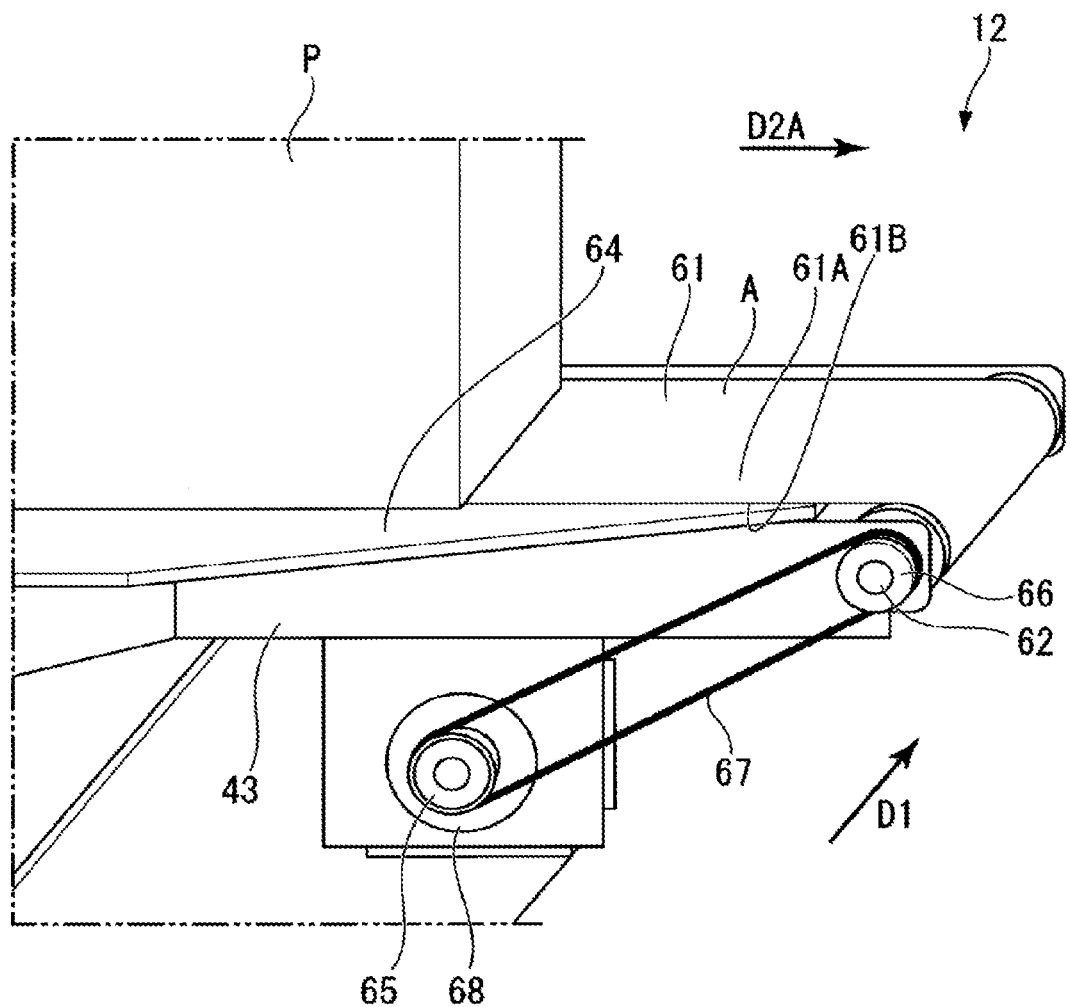
FIG. 5 is a perspective view schematically showing a configuration of a portion of a conveyor cell of the article sorting apparatus according to the embodiment.

As shown in FIG. 2 and FIG. 5, an upper surface out of an outer surface 61A of the cross belt 61, whose normal extends in a vertically upward direction, is formed as a load surface A on which an article P is to be placed. The belt support board 64 supports a portion of an inner surface 61B of the cross belt 61, namely the portion on the back side of the load surface A. Thus, the belt support board 64 acts against the weight of the cross belt 61 and the weight of the article P placed on the load surface A, and prevents the cross belt 61 from warping.

The driving roller 62 and the driven roller 63 each have a rotation shaft (not shown) that is supported by the frame portion 43. The respective rotation shafts of the driving roller 62 and the driven roller 63 are arranged parallel to each other in the front-rear direction (i.e., in the first conveyance direction D1), with a predetermined distance therebetween in the left-right direction (i.e., in the first transfer direction D2A and in the second transfer direction D2B) of the conveyor cell 12.

The motor-side toothed pulley 65 is coaxially connected to the motor 68. The roller-side toothed pulley 66 is coaxially connected to the driving roller 62. The timing belt 67 is a toothed endless belt that is engaged with the motor-side toothed pulley 65 and the roller-side toothed pulley 66. The timing belt 67 is stretched between the motor-side toothed pulley 65 and the roller-side toothed pulley 66. The timing belt 67 is rotated by rotational driving force of the motor-side toothed pulley 65, thereby rotating the roller-side toothed pulley 66.

The motor 68 is a DC motor, a brushless motor, or the like that is controlled by the cell control unit 47. The motor 68 is coaxially connected to the motor-side toothed pulley 65. The motor 68 produces rotational driving force using power that is fed from the contactless power feeder unit 34, and thus rotates the motor-side toothed pulley 65. The timing belt 67 transmits the rotation of the motor-side toothed pulley 65 to the roller-side toothed pulley 66. The roller-side toothed pulley 66 rotates the driving roller 62. The driving roller 62 transmits the rotation to the cross belt 61 and the driven roller 63. Thus, the cross belt 61 is driven in the left-right direction of the corresponding conveyor cell 12, thereby transferring the article P, which is placed on the load surface A, in the first transfer direction D2A and the second transfer direction D2B.

As shown in FIG. 4, the current sensor 69 detects electric current flowing through the motor 68. For example, the current sensor 69 detects regenerative current flowing through the motor 68 during deceleration of the motor 68.

As shown in FIG. 3, the battery 44 is provided in the chassis portion 41. The battery 44 stores power that is fed from the contactless power feeder unit 34. The battery 44 feeds power at least to the cell communication unit 46 and the cell control unit 47.

The cell communication unit 46 is provided in the chassis portion 41. The cell communication unit 46 transmits and receives various kinds of information using contactless communication (e.g., infrared communication, wireless communication, or the like) between the main control device 17 and the cell control unit 47. The cell communication unit 46 communicates with a communication unit 17a connected to the main control device 17. The cell communication unit 46 operates using power fed from the battery 44.

The cell control unit 47 is, for example, a PLC (programmable logic controller), a control board, or the like. The cell control unit 47 is fixed to the chassis portion 41. The cell control unit 47 operates using power fed from the battery 44. The cell control unit 47 controls the driving of the motor 68 according to a control instruction that is output from the main control device 17.

The storage unit 48 is fixed to the chassis portion 41. The storage unit 48 stores various kinds of data. For example, the storage unit 48 stores driving pattern data that is used by the cell control unit 47 when controlling the driving of the motor 68.

The information obtaining unit 13 is provided with, for example, an optical character recognition (OCR) device, a code reading device that reads a one-dimensional code, a two-dimensional code, or the like, or an RF reader that communicates with an IC tag that is attached to or built into the article P. The information obtaining unit 13 is located at a position that is upstream of the loading device 14, for example. The information obtaining unit 13 obtains information that has been attached to each article P that is to be transported to the loading device 14, and transmits the information thus obtained to the main control device 17. The information attached to each article P includes, for example, a classification destination (a sorting destination) and the weight of the article P.

Figure 6:
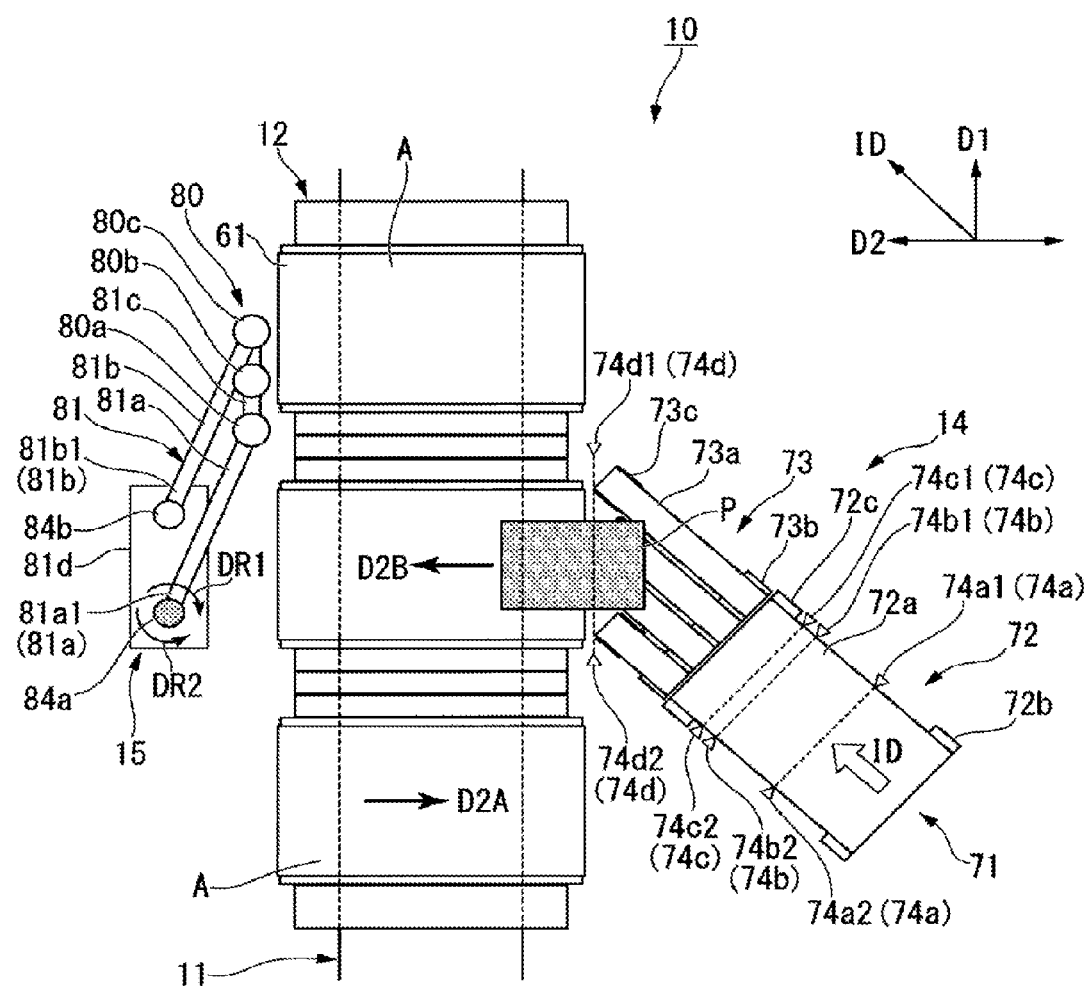
FIG. 6 is a plan view schematically showing configurations of a loading device, a positioning device, and some of the conveyor cells of the article sorting apparatus according to the embodiment.

As shown in FIG. 1 and FIG. 6, the loading device 14 loads articles P onto the plurality of conveyor cells 12. The loading device 14 is, for example, located on an outer side of the conveyance path 11. That is to say, if the first conveyance direction D1 is a counterclockwise conveyance direction, the loading device 14 is located on the right side of the conveyance path 11 (the first transfer direction D2A side of the conveyor cells 12) when viewed in the first conveyance direction D1.

The loading device 14 is provided with at least one injector 71 (e.g. a plurality of injectors 71). Each of the injectors 71 is provided with: a first conveyance portion 72 and a second conveyance portion 73 that are arranged along a transfer direction ID that intersects the first conveyance direction D1 of the conveyance path 11 at a predetermined acute angle.

The first conveyance portion 72 is provided with: a first loading belt 72a that is driven in the transfer direction ID; and a first driving roller 72b and a first driven roller 72c between which the first loading belt 72a is stretched. The first driving roller 72b and the first driven roller 72c are arranged parallel to each other, with a predetermined distance left therebetween in the transfer direction ID. The first loading belt 72a is rotated by rotational driving force of the first driving roller 72b, thereby rotating the first driven roller 72c.

The second conveyance portion 73 is provided with a plurality of second loading belts 73a that are driven in the transfer direction ID. Each of the second loading belts 73a is formed such that the width thereof (the belt width in a direction orthogonal to the transfer direction ID) is smaller than the width of the first loading belt 72a. The plurality of second loading belts 73a are arranged at predetermined intervals in the width direction (i.e., the direction orthogonal to the transfer direction ID). Each of the second loading belts 73a is stretched between a second driving roller 73b and a second driven roller 73c that are arranged parallel to each other with a predetermined distance therebetween in the transfer direction ID. The second loading belts 73a are rotated by rotational driving force of the second driving roller 73b, thereby rotating the second driven roller 73c.

Thus, the injectors 71 sequentially transfer articles P in the transfer direction ID, which intersects the first conveyance direction D1 of the conveyance path 11 at a predetermined acute angle, from the first conveyance portion 72 and the second conveyance portion 73 to the desired conveyor cell 12.

Each injector 71 is provided with a plurality of optical sensors that are provided for the first conveyance portion 72 and the second conveyance portion 73. For example, the plurality of optical sensors are: a first optical sensor 74a, a second optical sensor 74b, and a third optical sensor 74c, which are provided for the first conveyance portion 72; and a fourth optical sensor 74d, which is provided for the second conveyance portion 73.

The first optical sensor 74a, the second optical sensor 74b, and the third optical sensor 74c are each provided with a light emitting portion and a light receiving portion that are arranged to face each other with the space above the first conveyance portion 72 therebetween. The light emitting portion and the light receiving portion of the first optical sensor 74a are a first light emitting portion 74a1 and a first light receiving portion 74a2, respectively. The light emitting portion and the light receiving portion of the second optical sensor 74b are a second light emitting portion 74b 1 and a second light receiving portion 74b2, respectively. The light emitting portion and the light receiving portion of the third optical sensor 74c are a third light emitting portion 74c1 and a third light receiving portion 74c2, respectively. The first optical sensor 74a, the second optical sensor 74b, and the third optical sensor 74c are sequentially arranged along the transfer direction ID at predetermined intervals.

The fourth optical sensor 74d is provided with a light emitting portion and a light receiving portion that are arranged to face each other with the space above the second conveyance portion 73 therebetween. The light emitting portion and the light receiving portion of the fourth optical sensor 74d are a fourth light emitting portion 74d1 and a fourth light receiving portion 74d2, respectively. The fourth optical sensor 74d is located near a front end portion (a downstream end portion) of the second conveyance portion 73, for example.

In each of the optical sensors 74a, 74b, 74c, and 74d, irradiation light output from the light emitting portion is received by the light receiving portion when no article P is present in the optical axis. The optical sensors 74a, 74b, 74c, and 74d output an ON signal when an article P is present in the optical axis of irradiation light output from the light emitting portion thereof, and the article P interrupts the receipt of the irradiation light by the light receiving portion thereof. The optical sensors 74a, 74b, 74c, and 74d output an OFF signal when no article P is present in the optical axis of irradiation light output from the light emitting portion thereof, and the irradiation light is continuously received by the light receiving portion thereof.

Figure 7:
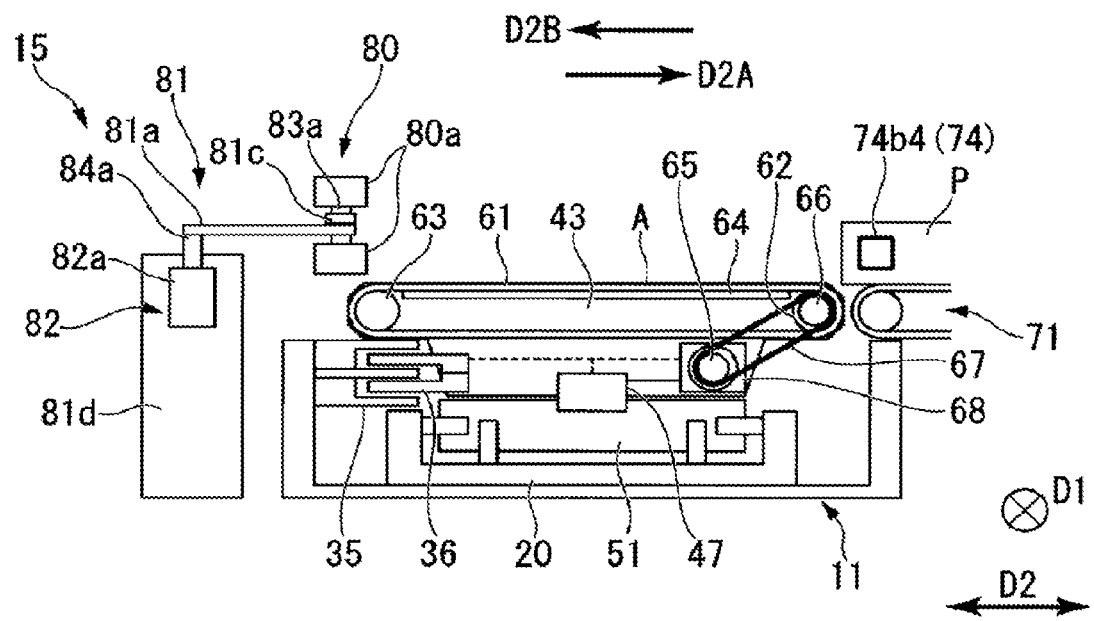
FIG. 7 is a cross-sectional view schematically showing configurations of the loading device, the positioning device, and a portion of the conveyor cell of the article sorting apparatus according to the embodiment.
Figure 8:
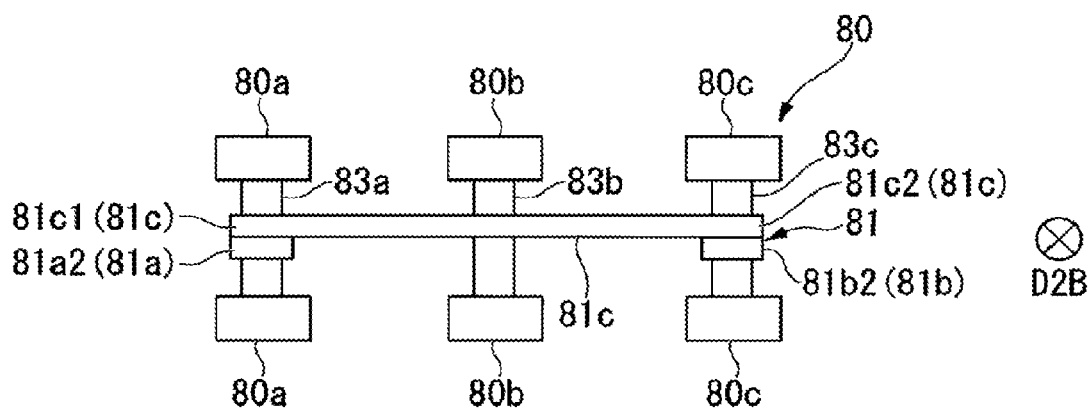
FIG. 8 is a schematic diagram showing a contact member of the positioning device of the article sorting apparatus according to the embodiment viewed along a second transfer direction.
Figure 9:
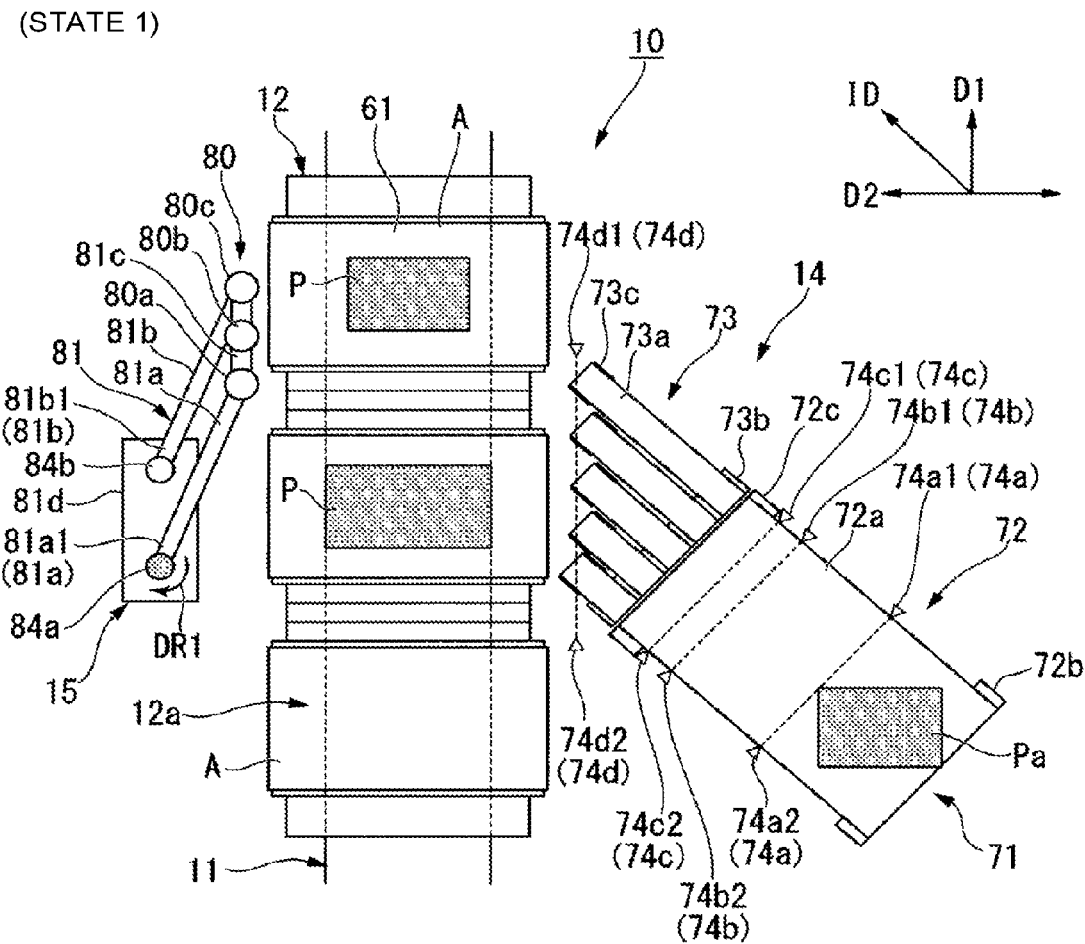
FIG. 9 is a plan view schematically showing State 1 that arises along with an example of operation of the article sorting apparatus according to the embodiment.
Figure 10:
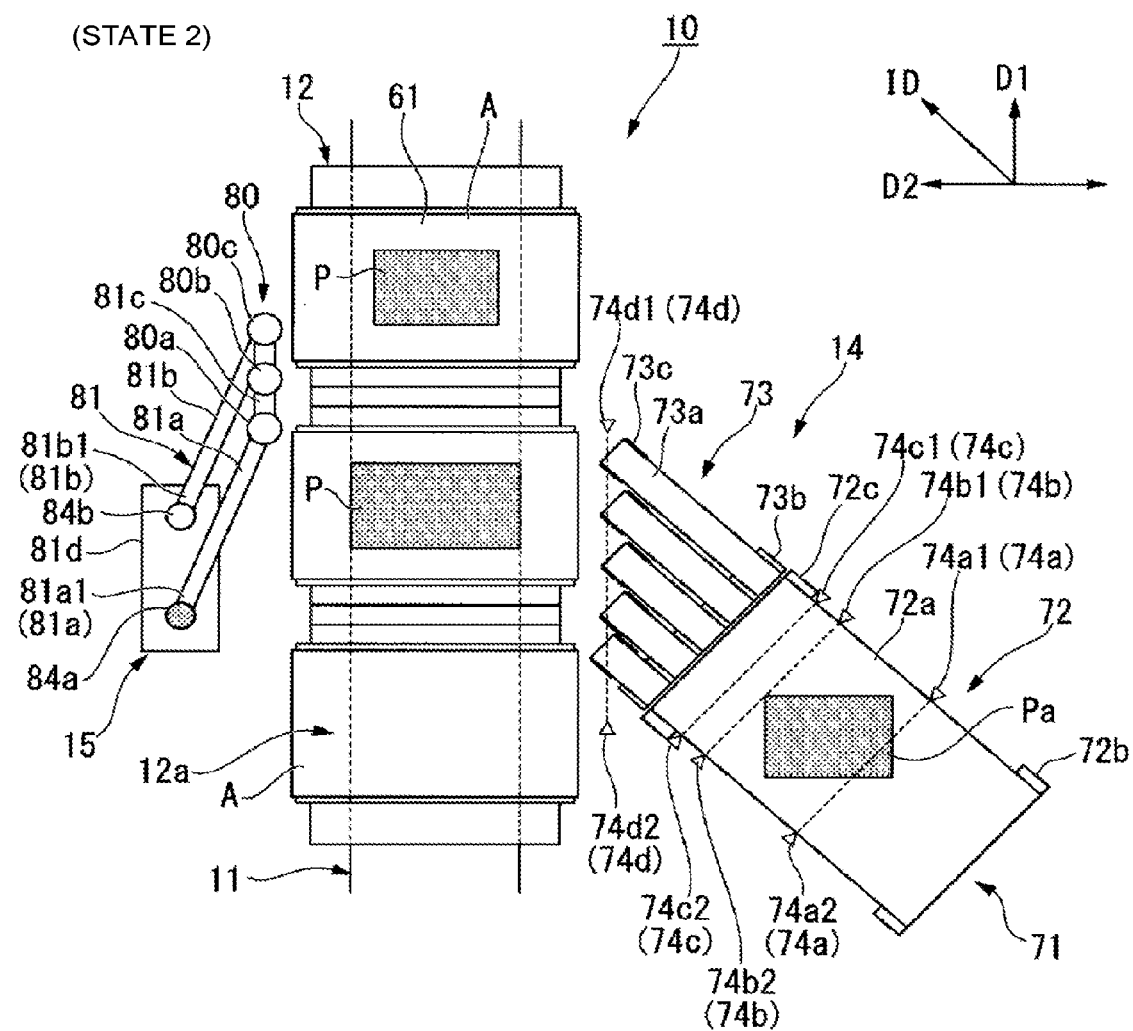
FIG. 10 is a plan view schematically showing State 2 that arises along with the example of operation of the article sorting apparatus according to the embodiment.
Figure 11:
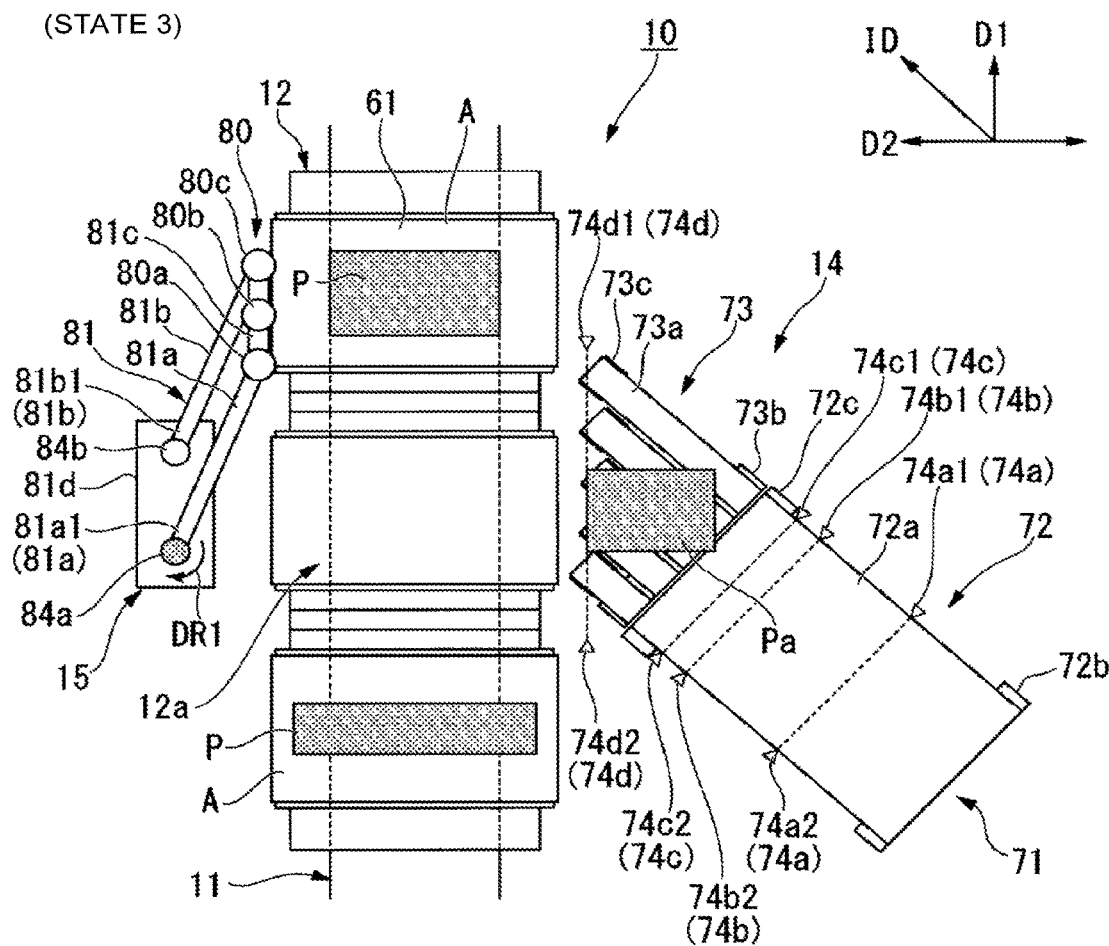
FIG. 11 is a plan view schematically showing State 3 that arises along with the example of operation of the article sorting apparatus according to the embodiment.
Figure 12:
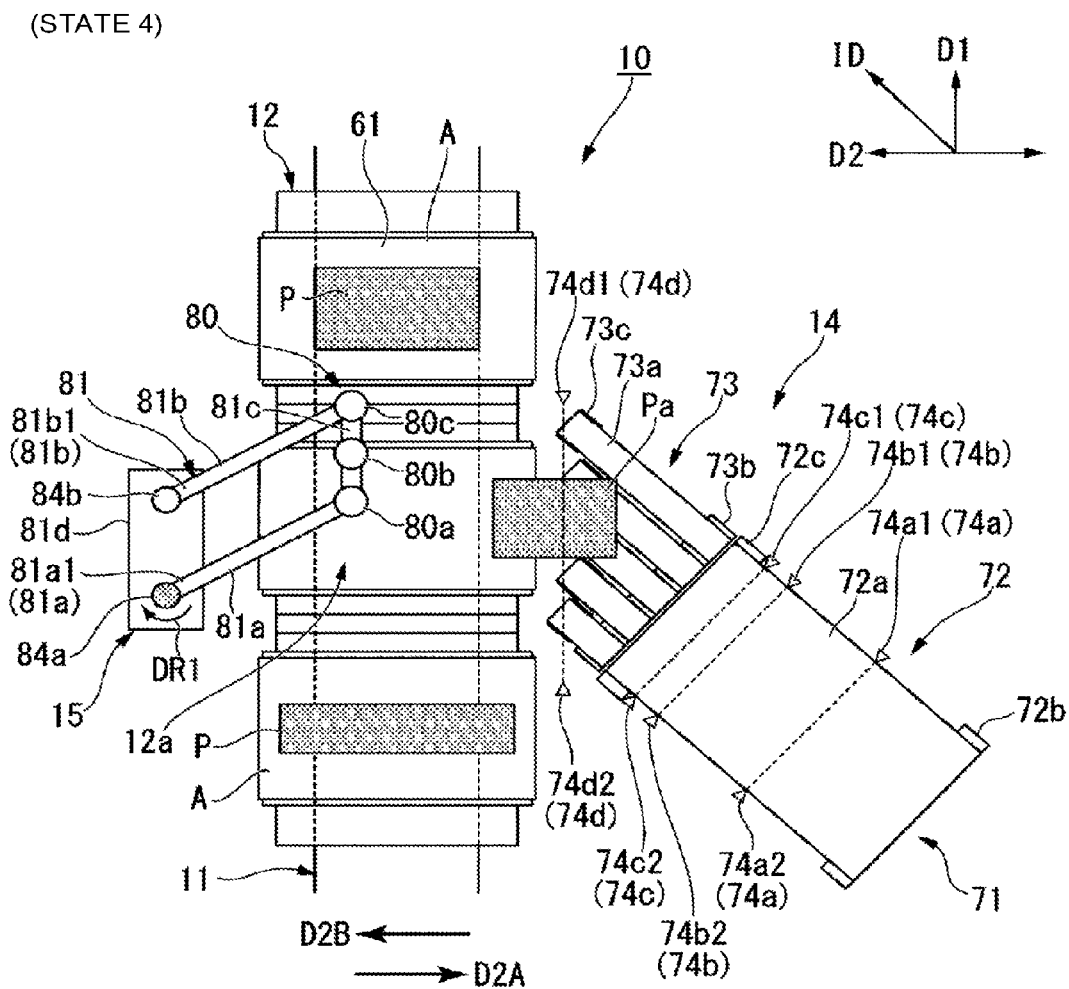
FIG. 12 is a plan view schematically showing State 4 that arises along with the example of operation of the article sorting apparatus according to the embodiment.
Figure 13:
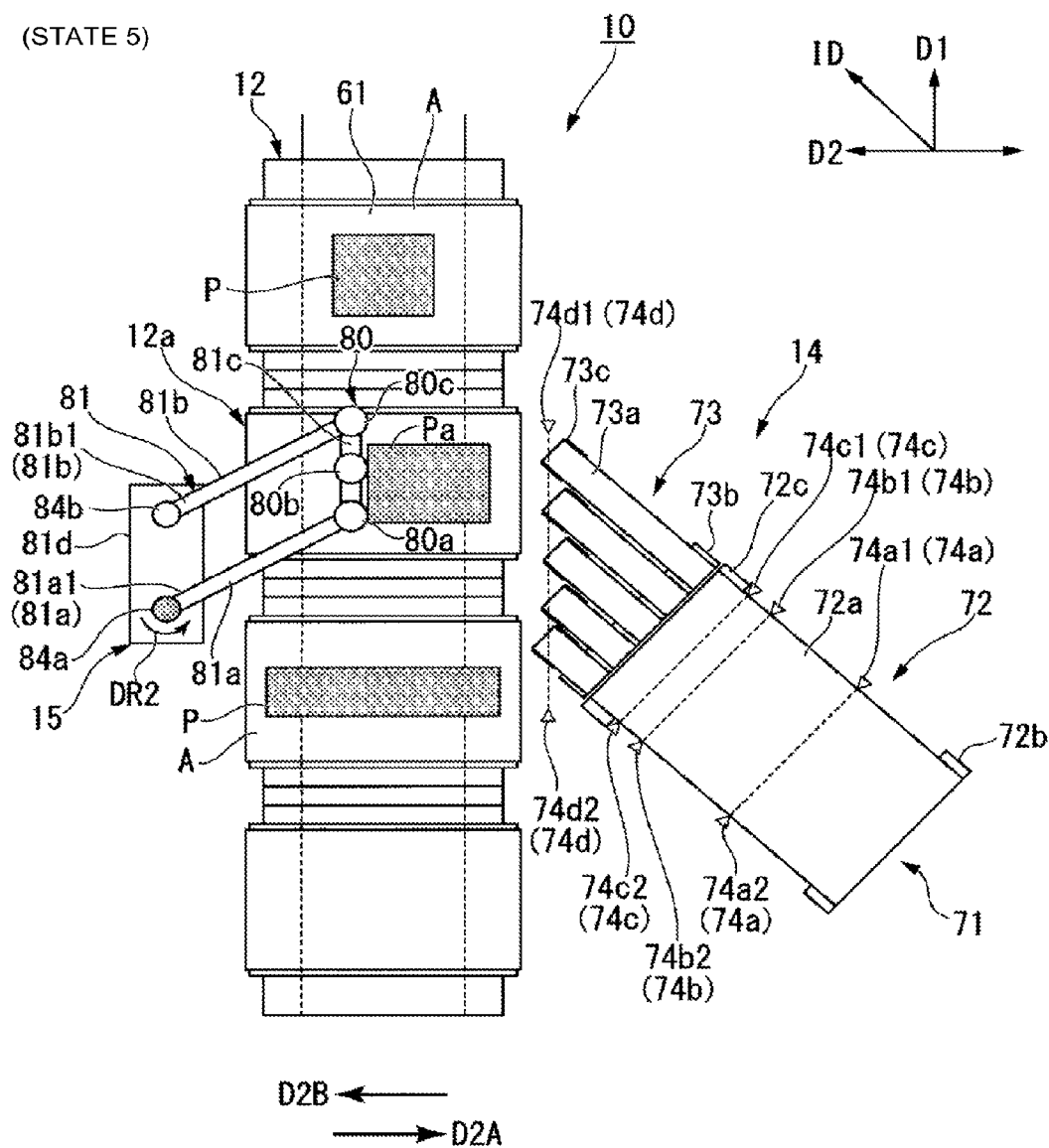
FIG. 13 is a plan view schematically showing State 5 that arises along with the example of operation of the article sorting apparatus according to the embodiment.

The positioning devices 15 are located opposite the loading device 14 with respect to the conveyance path 11. The positioning devices 15 face a front end portion of the second conveyance portions 73 of the injectors 71. As shown in FIGS. 6, 7, and 8, the positioning devices 15 are provided with: a contact member 80; a linkage mechanism 81 on which the contact member 80 is provided; and a driving unit 82 that drives the linkage mechanism 81.

The contact member 80 is provided with at least one contact roller. At least one contact roller means, for example, a plurality of contract rollers composed of a pair of first contact rollers 80a, a pair of second contact rollers 80b, and a pair of third contact rollers 80c. The pairs of contact rollers 80a, 80b, and 80c are respectively provided on both end portions of a rotation shaft 83a, both end portions of a rotation shaft 83b, and both end portions of a rotation shaft 83c. The rotation shafts 83a, 83b, and 83c extend in the vertical direction. The rotation shafts 83a, 83b, and 83c are individually and rotatably supported by the linkage mechanism 81. Each of the contact rollers 80a, 80b, and 80c is rotated by frictional force that is generated between the contact roller and an article P when the contact roller is brought into contact with the article P moving in the first conveyance direction D1, for example. An area of each of the contact rollers 80a, 80b, and 80c that is in contact with the article P thus moves in synchronization with the article P moving in the first conveyance direction D1.

The linkage mechanism 81 is provided with: a driving link (a first link) 81a; a driven link (second link) 81b; a contact link (third link) 81c; and a main body frame (fourth link) 81d, which constitute parallel links, for example.

The driving link 81a has a straight rod shape, for example. A first end portion 81a1 of the driving link 81a is provided with a rotation shaft 84a that is rotatably supported by the main body frame 81d. The rotation shaft 84a constitutes a first fixed joint that supports the driving link 81a such that the driving link 81a is rotatable relative to the main body frame 81d. A second end portion 81a2 of the driving link 81a is rotatably connected to a first end portion 81c1 of the contact link 81c by the rotation shaft 83a of the first contact roller 80a. The rotation shaft 83a of the first contact roller 80a constitutes a first movable joint that supports the driving link 81a and the contact link 81c such that the driving link 81a and the contact link 81c are rotatable relative to each other.

The driven link 81b has a straight rod shape, for example. The length of the driven link 81b is the same as the length of the driving link 81a. A first end portion 81b1 of the driven link 81b is provided with a rotation shaft 84b that is rotatably supported by the main body frame 81d. The rotation shaft 84b constitutes a second fixed joint that supports the driven link 81b such that the driven link 81b is rotatable relative to the main body frame 81d. A second end portion 81b2 of the driven link 81b is rotatably connected to a second end portion 81c2 of the contact link 81c by the rotation shaft 83c of the third contact roller 80c. The rotation shaft 83c of the third contact roller 80c constitutes a second movable joint that supports the driven link 81b and the contact link 81c such that the driven link 81b and the contact link 81c are rotatable relative to each other.

The rotation shaft 84a of the driving link 81a in the first fixed joint and the rotation shaft 84b of the driven link 81b in the second fixed joint are located in parallel to the first conveyance direction D1 in the main body frame 81d.

The contact link 81c has a straight rod shape, for example. The contact link 81c is located in parallel to the first conveyance direction D1. The contact link 81c rotatably supports the respective rotation shafts 83a, 83b, and 83c of the contact rollers 80a, 80b, and 80c. The contact link 81c supports the first contact roller 80a, the second contact roller 80b, and the third contact roller 80c such that the outer peripheries of the contact rollers 80a, 80b, and 80c have the same tangent line that is parallel to the first conveyance direction D1. The contact link 81c moves in the second conveyance direction D2 along with the rotation of the driving link 81a, while being maintained in parallel to the first conveyance direction D1. The contact link 81c moves the contact rollers 80a, 80b, and 80c in the second conveyance direction D2 while maintaining the common tangent line of the outer peripheries of the contact rollers 80a, 80b, and 80c in parallel to the first conveyance direction D1.

The shape and the size of the contact member 80 and the linkage mechanism 81 are determined such that, at least when a desired conveyor cell 12 faces the front end portion (the downstream end portion) of the injector 71, the contact member 80 and the linkage mechanism 81 are not brought into contact with articles P that are loaded on the conveyor cell 12 that is located upstream of and adjacent to the desired conveyor cell 12 and on the conveyor cell 12 that is located downstream of and adjacent to the desired conveyor cell 12. The positions of the contact rollers 80a, 80b, and 80c of the contact member 80 and the positions of the driving link 81a, the driven link 81b, and the contact link 81c of the linkage mechanism 81, with respect to the vertical direction, are set to be higher than the load surface A of the cross belt 61 of each conveyor cell 12. The positions of the contact rollers 80a, 80b, and 80c of the contact member 80, with respect to the vertical direction, are set such that the contact rollers 80a, 80b, and 80c are brought into contact with a side surface of an article P loaded onto the cross belt 61 of each conveyor cell 12.

The driving unit 82 is located in the main body frame 81d. The driving unit 82 is provided with an actuator 82a of a rotation type, such as a servo motor, for example. The driving unit 82 is connected to the rotation shaft 84a of the driving link 81a. The driving unit 82 rotates the driving link 81a about the rotation shaft 84a in a first rotation direction DR1 or a second rotation direction DR2.

The sorting unit 16 receives an article P discharged from each of the plurality of conveyor cells 12. As shown in FIG. 1, the sorting unit 16 is provided with a plurality of chutes 91 for different classification destinations. The plurality of chutes 91 are arranged along the first conveyance direction D1 of the conveyance path 11. For example, the sorting unit 16 is provided with the plurality of chutes 91 on the inner side and the outer side of the conveyance path 11, that is, on the right side and the left side of the conveyance path 11 when viewed in the first conveyance direction D1.

The main control device 17 performs overall control of the article sorting apparatus 10.

The main control device 17 controls the state of electric current flowing through the electromagnetic coil 32 of the linear synchronous motor 31, thereby controlling acceleration, deceleration, stop (emergency stop etc.), and the like of the conveyor cells 12. The main control device 17 manages information regarding the article P (e.g., the classification destination (the sorting destination), the weight, and the like of the article P) obtained by the information obtaining unit 13, and various kinds of information detected by the plurality of optical sensors, such as the passage timing of the article P. The main control device 17 obtains, for example, an ON period from the switching from the OFF signal to the ON signal to the switching from the ON signal to the OFF signal in each of the optical sensors 74a, 74b, 74c, and 74d of the injectors 71. The main control device 17 detects the length of an article P based on the ON period thus obtained and an already-known transfer speed of articles P on the injectors 71. The length of an article P is, for example, a length in the second conveyance direction D2. Note that information regarding the length of an article P may be attached to the article P, and may be obtained by the information obtaining unit 13.

The main control device 17 communicates with the loading device 14, the positioning devices 15, the information obtaining units 13, and the sorting unit 16 by performing wired or wireless communication, and transmits and receives various kinds of information. The main control device 17 controls the operations of the loading device 14, the positioning devices 15, the information obtaining units 13, and the sorting unit 16 by transmitting control instructions thereto. The main control device 17 transmits and receives various kinds of information by performing contactless communication with the cell control unit 47 of each of the plurality of conveyor cells 12. The main control device 17 transmits, to each cell control unit 47, a control instruction indicating the control operation to be performed by the cell control unit 47.

The main control device 17 synchronizes the operation of the motor 68 of the conveyor cells 12 performed to control the acceleration/deceleration driving and stopping of the cross belt 61, with the operation of the injectors 71 performed to transfer an article P, so that the articles P are delivered from the injectors 71 of the loading device 14 to the corresponding conveyor cells 12. The main control device 17 transmits, to the cell control unit 47 of each conveyor cell 12, a control instruction that specifies the timing at which the motor 68 of the conveyor cell 12 performs acceleration/deceleration driving of the cross belt 61 and stops the cross belt 61.

The cell control unit 47 of each conveyor cell 12 controls the acceleration/deceleration driving and stopping of the motor 68 according to the timing specified by the main control device 17, thereby controlling the cross belt 61 so that the cross belt 61 receives and holds the article P. Thus, the loading device 14 transfers articles P onto the load surfaces A of the conveyor cells 12 from the injectors 71.

If control pattern data for the motor 68 is stored in the storage unit 48 in advance, the cell control unit 47 of each conveyor cell 12 controls the motor 68 by using the control pattern data stored in the storage unit 48.

The main control device 17 controls the driving unit 82 of the positioning device 15 in synchronization with the control of the motor 68 of each conveyor cell 12. The main control device 17 controls positional adjustment performed by the positioning device 15 to adjust the position of an article P on a conveyor cell 12. The main control device 17 rotates the driving link 81a about the rotation shaft 84a using the driving unit 82, thereby driving the contact member 80, which is provided on the contact link 81c, in the second conveyance direction D2. The main control device 17 drives the contact member 80 in the second conveyance direction D2, thereby bringing the contact rollers 80a, 80b, and 80c of the contact member 80 into contact with an article P loaded onto a conveyor cell 12 by the loading device 14. The main control device 17 controls the driving unit 82 based on information such as the length of an article P in the second conveyance direction D2, which is transmitted from the main control device 17, the passage timing of the article P detected by the optical sensors 74a, 74b, 74c, and 74d. The main control device 17 controls the driving unit 82 so that the contact rollers 80a, 80b, and 80c of the contact member 80 are brought into contact with an article P, and supports the article P stopping at a given position on the load surface A of a conveyor cell 12. The main control device 17 stores predetermined data in advance, the data showing the relationship between the rotation angle by which the driving unit 82 rotates the driving link 81a, and the amount of movement of the contact link 81c in the second conveyance direction D2, for example. The main control device 17 controls the rotation angle by which the driving unit 82 rotates the driving link 81a, based on the stored predetermined data, the length of the article P in the second conveyance direction D2, and the state of the article P to be transferred by the motor 68 of the conveyor cell 12, thereby controlling the stopping position of the article P that has been brought into contact with the contact member 80, so that the article P is stopped at the desired position.

The main control device 17 obtains information regarding the article P, which has been loaded onto the load surface A of the conveyor cell 12 by the loading device 14, from the information obtaining unit 13. The main control device 17 determines the classification destination of the article P according to the information regarding the article P received from the information obtaining unit 13, and selects a chute 91 that corresponds to the determined classification destination from among the plurality of chutes 91 of the sorting unit 16. The main control device 17 sets the timing at which the motor 68 of the corresponding conveyor cell 12 drives the cross belt 61 (i.e., the timing at which the article P is thrown into the selected chute 91) so that the article P is thrown into the selected chute 91 from the conveyor cell 12. The main control device 17 transmits, to the cell control unit 47 of the corresponding conveyor cell 12, a control instruction that specifies the timing at which the motor 68 of the conveyor cell 12 drives the cross belt 61.

The cell control unit 47 of the corresponding conveyor cell 12 controls the driving of the motor 68 according to the timing specified by the main control device 17, thereby controlling the cross belt 61 so that the cross belt 61 throws the article P into or onto the chutes 91. Thus, the sorting unit 16 sorts the articles P according to the classification destinations corresponding to the information regarding the articles P on the conveyor cells 12. If control pattern data used by the motor 68 when performing an operation to send out an article P is stored in the storage unit 48 in advance, the cell control unit 47 of each conveyor cell 12 controls the motor 68 by using the control pattern data stored in the storage unit 48.

The following describes the operations of the article sorting apparatus 10 according to the above-described embodiment.

The following describes time-series operations performed when, for example, an article Pa is loaded onto one empty conveyor cell 12a from among the plurality of conveyor cells 12 that circulate along the conveyance path 11 shown in FIG. 1, with reference to FIGS. 9 to 15. Empty conveyor cells 12 other than the conveyor cell 12a described below perform the same operation as the conveyor cell 12a.

In the following description, it is assumed that the conveyor cells 12 move along the conveyance path 11 at a constant conveyance speed V (e.g., a predetermined speed within a range of approximately 2.0 m/s to approximately 4.0 m/s). The articles P to be loaded onto the conveyor cells 12 are classified to respective chutes 91 of the sorting unit 16.

When an empty conveyor cell 12a on which no article P is loaded enters the loading device 14, the main control device 17 instructs the loading device 14 to deliver the article Pa to the conveyor cell 12a. The main control device 17 instructs the cell control unit 47 of that conveyor cell 12a to control the driving of the cross belt 61 using the motor 68 in synchronization with the transfer of the article Pa by the corresponding injector 71 of the loading device 14. The main control device 17 instructs the cell control unit 47 to draw the article Pa from the injector 71 onto the load surface A of the cross belt 61, and to stop the cross belt 61 onto which the article Pa has been loaded. The main control device 17 instructs the positioning device 15 to support the stopping of the article Pa loaded onto the load surface A of the cross belt 61, in synchronization with the control of the driving of the cross belt 61.

Information attached to the article Pa to be transported to the loading device 14 has been obtained by the information obtaining unit 13 in advance. Based on various kinds of information obtained by the information obtaining unit 13, the main control device 17 controls the loading device 14, the positioning device 15, and the sorting unit 16 handling the article Pa.

The main control device 17 recognizes the presence of the article Pa on one of the injectors 71 of the loading device 14 by detecting that the output from the first optical sensor 74a switches from the OFF signal to the ON signal, for example. When the empty conveyor cell 12a enters the loading device 14 in a situation where the article Pa is present on the injector 71, the main control device 17 instructs the injector 71 to start driving (State 1 shown in FIG. 9).

The first loading belt 72a of the first conveyance portion 72 is accelerated in the transfer direction ID by the rotational driving force of the first driving roller 72b that has started driving according to the control instruction from the main control device 17. The main control device 17 accelerates the first loading belt 72a such that the transfer speed of the article Pa reaches a predetermined loading speed VI no later than when the article Pa transferred by the first loading belt 72a in the transfer direction ID is detected by the second optical sensor 74b. Upon the transfer speed of the article Pa reaching the predetermined loading speed VI, the main control device 17 rotates the first loading belt 72a at a constant speed in order to maintain the transfer speed of the article Pa at the loading speed VI (State 2 shown in FIG. 10).

The predetermined loading speed VI is the speed at which the magnitude of the component of the loading speed VI in the first conveyance direction D1 is substantially equal to the conveyance speed V of the conveyor cell 12 in the first conveyance direction D1. The main control device 17 determines whether or not the transfer speed of the article Pa is substantially equal to the predetermined loading speed VI, based on the timing at which the second optical sensor 74b and the third optical sensor 74c detects the article Pa, for example. The main control device 17 obtains the amount of time (passage time) elapsed from when the output from the second optical sensor 74b switches from the OFF signal to the ON signal to when the output from the third optical sensor 74c switches from the OFF signal to the ON signal. The passage time is the amount of time required for the article Pa to pass from the optical axis of the second optical sensor 74b to the optical axis of the third optical sensor 74c. The main control device 17 calculates the transfer speed of the article Pa by using the passage time thus obtained and the already-known distance between the optical axes of the second optical sensor 74b and the third optical sensor 74c, and determines whether or not the transfer speed thus calculated is within a predetermined error range of the loading speed VI.

If the main control device 17 determines that the transfer speed of the article Pa is substantially equal to the loading speed VI, the main control device 17 determines whether or not the transfer of the article Pa by the injector 71 and the movement of the empty conveyor cell 12a along the conveyance path 11 are in synchronization. For example, the main control device 17 determines whether or not the empty conveyor cell 12a is located at a predetermined position on the conveyance path 11 when the article Pa is detected by the third optical sensor 74c, for example. The predetermined position on the conveyance path 11 is the position at which the empty conveyor cell 12a needs to be located in order for the empty conveyor cell 12a at the conveyance speed V to reach the position that faces the front end portion of the injector 71 when the article Pa at the loading speed VI reaches the front end portion (the downstream end portion) of the injector 71. The main control device 17 may obtain the positional information of the empty conveyor cell 12a on the conveyance path 11 by using various kinds of sensors such as a camera provided on the conveyance path 11. The main control device 17 may obtain the positional information of the empty conveyor cell 12a on the conveyance path 11 based on, for example, prestored data regarding the movement of the plurality of conveyor cells 12 and data of the history of operations performed to control the loading device 14 and the sorting unit 16.

If the transfer speed of the article Pa is not substantially equal to the loading speed VI, or if the transfer of the article Pa by the injector 71 and the movement of the empty conveyor cell 12a along the conveyance path 11 are not in synchronization, the main control device 17 suspends the transfer of the article Pa. After suspending the transfer of the article Pa in the transfer direction ID using the injector 71, the main control device 17 transfers the article Pa in the direction opposite to the transfer direction ID using the injector 71. The main control device 17 transfers the article Pa in the direction opposite to the transfer direction ID until the article Pa returns to the position where the article Pa was located before the driving of the injector 71 was started. As indicated by State 1 shown in FIG. 9, upon the article Pa returning to the position where the article Pa was located before the driving of the injector 71 was started, the main control device 17 stops the driving of the injector 71, and transitions to a standby state.

On the other hand, if the transfer speed of the article Pa is substantially equal to the loading speed VI, and the transfer of the article Pa by the injector 71 and the movement of the empty conveyor cell 12a along the conveyance path 11 are in synchronization, the main control device 17 performs processing shown in State 3 and the subsequent processing described below.

Each of the plurality of second loading belts 73a of the second conveyance portion 73 is driven in the transfer direction ID by the rotational driving force of the second driving roller 73b that has started driving according to the control instruction from the main control device 17, as with the first loading belt 72a of the first conveyance portion 72. The main control device 17 rotates the plurality of second loading belts 73a at a constant speed in order to maintain the transfer speed of the article Pa, which is transferred by the plurality of second loading belts 73a in the transfer direction ID, at the loading speed VI. Each of the plurality of second loading belts 73a of the second conveyance portion 73 transfers the article Pa, which has been received from the first loading belt 72a of the first conveyance portion 72, in the transfer direction ID at a transfer speed that is substantially the same as the predetermined loading speed VI.

The main control device 17 instructs to start driving the cross belt 61 of the empty conveyor cell 12a when the article Pa is transferred by the second conveyance portion 73. The cross belt 61 of the conveyor cell 12a is accelerated in the second conveyance direction D2 by the rotational driving force of the motor 68 that has started driving according to the control instruction from the main control device 17. The main control device 17 accelerates the cross belt 61 until the driving speed of the cross belt 61 reaches the magnitude of the component of the loading speed VI in the second conveyance direction D2. Upon the driving speed of the cross belt 61 reaching the magnitude of the component of the loading speed VI in the second conveyance direction D2, the main control device 17 rotates the cross belt 61 at a constant speed in order to maintain the driving speed of the cross belt 61.

Upon the article Pa, which is transferred in the transfer direction ID by the plurality of second loading belts 73a, being detected by the fourth optical sensor 74d, the main control device 17 instructs to start driving the linkage mechanism 81 of the positioning device 15. The linkage mechanism 81 of the positioning device 15 rotates the driving link 81a in the first rotation direction DR1 about the rotation shaft 84a using the rotational driving force of the driving unit 82 that has started driving according to the control instruction from the main control device 17. The contact link 81c moves in the first transfer direction D2A along with the rotation of the driving link 81a, while being maintained in parallel to the first conveyance direction D1. The contact link 81c moves the contact rollers 80a, 80b, and 80c in the first transfer direction D2A while maintaining the common tangent line of the outer peripheries of the contact rollers 80a, 80b, and 80c in parallel to the first conveyance direction D1 (State 3 shown in FIG. 11).

The timing at which the main control device 17 starts driving the linkage mechanism 81 is set to a timing at which the linkage mechanism 81 and the contact member 80 are not brought into contact with the articles P loaded onto the conveyor cell 12 that is located upstream of and adjacent to the empty conveyor cell 12a and on the conveyor cell 12 that is located downstream of and adjacent to the empty conveyor cell 12a. The timing at which the main control device 17 starts driving the linkage mechanism 81 is set to, for example, a timing at which the empty conveyor cell 12a faces the front end portion (the downstream end portion) of the second conveyance portion 73 of the injector 71.

The cell control unit 47 of the empty conveyor cell 12a draws the article Pa from the injector 71 onto the load surface A of the cross belt 61 according to the control instruction from the main control device 17. The positioning device 15 moves the contact rollers 80a, 80b, and 80c of the contact member 80 to a position that is vertically above the load surface A of the conveyor cell 12a and that is close to the center of the load surface A with respect to the second conveyance direction D2, according to the control instruction from the main control device 17 (State 4 shown in FIG. 12).

The cell control unit 47 of the conveyor cell 12a decelerates the rotation of the motor 68 after more than half of the article Pa in terms of the length in the second conveyance direction D2 is loaded onto the load surface A, for example, according to the control instruction from the main control device 17. The cell control unit 47 of the conveyor cell 12a performs control to decelerate the cross belt 61 based on the control pattern data corresponding to an article P having a typical weight that has been stored in the storage unit 48 in advance so that the article Pa is stopped near the center of the load surface A with respect to the second conveyance direction D2. The typical weight of an article P is a predetermined weight within the range of 2 kg to 20 kg, for example.

The main control device 17 moves the contact rollers 80a, 80b, and 80c such that the motor 68 decelerates according to a predetermined deceleration curve, and the article Pa moves along a trajectory that is assumed if the article Pa does not slip on the load surface A while the article Pa decelerates. The main control device 17 controls the positions of the contact rollers 80a, 80b, and 80c such that the contact rollers 80a, 80b, and 80c are decelerated to stop together with the article Pa, while at least one of the contact rollers 80a, 80b, and 80c being in contact with the article Pa on the load surface A. The main control device 17 rotates the driving link 81a in the second rotation direction DR2 about the rotation shaft 84*a* using the rotational driving force of the driving unit 82, thereby moving the contact link 81*c* in the second transfer direction D2B. The contact link 81*c* moves the contact rollers 80*a*, 80*b*, and 80*c* in the second transfer direction D2B while maintaining the common tangent line of the outer peripheries of the contact rollers 80*a*, 80*b*, and 80*c* in parallel to the first conveyance direction D 1. At least one of the contact rollers 80*a*, 80*b*, and 80*c* that is in contact with the article Pa on the load surface A are rotated by the frictional force that is generated between the contact roller and the article P, along with the article Pa being conveyed in the second transfer direction D2B and in the first conveyance direction D1 (State 5 shown in FIG. 13).

In a situation where at least a portion of the article Pa is supported by the second conveyance portion 73 of the injector 71, the main control device 17 may decelerate the component of the loading speed VI of the article Pa in the injector 71 in the second conveyance direction D2 as with the driving speed of the cross belt 61.

Figure 14:
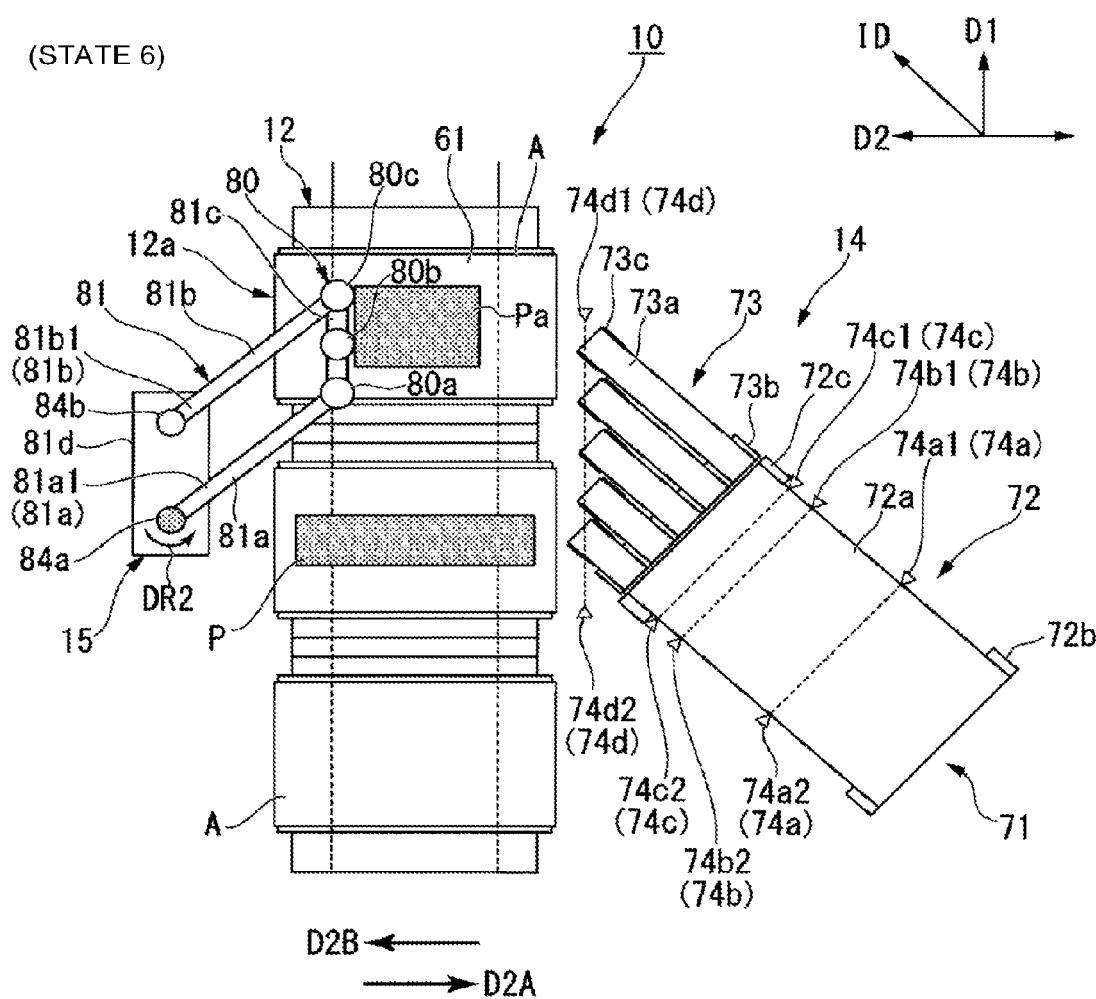
FIG. 14 is a plan view schematically showing State 6 that arises along with the example of operation of the article sorting apparatus according to the embodiment.
Figure 15:
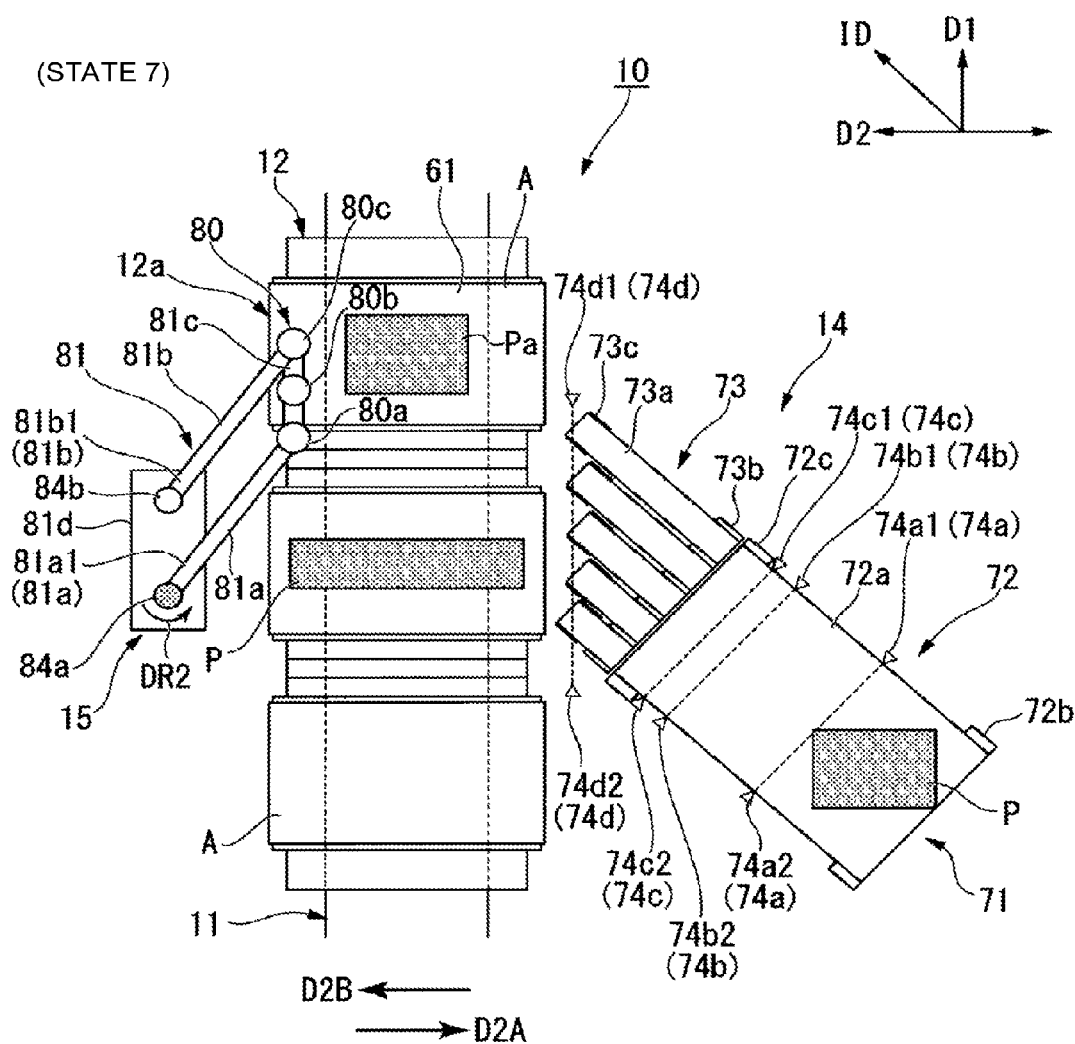
FIG. 15 is a plan view schematically showing State 7 that arises along with the example of operation of the article sorting apparatus according to the embodiment.

Upon the article Pa reaching a position near the center of the load surface A with respect to the second conveyance direction D2, the main control device 17 stops the cross belt 61 driven by the motor 68 and the driving link 81*a* driven by the driving unit 82 (State 6 shown in FIG. 14).

After stopping the motor 68 and the driving unit 82, the main control device 17 rotates the driving link 81*a* in the second rotation direction DR2 about the rotation shaft 84*a* using the rotational driving force of the driving unit 82, thereby retracting the contact member 80 and the linkage mechanism 81 in the second transfer direction D2B. The main control device 17 moves the contact rollers 80*a*, 80*b*, and 80*c*, and the driving link 81*a*, the driven link 81*b*, and the contact link 81*c* in the second transfer direction D2B such that they are not brought into contact with the article P on the conveyor cell 12 that is located upstream of and adjacent to the conveyor cell 12*a* (State 7 shown in FIG. 15).

The main control device 17 selects an appropriate classification destination from among the plurality of chutes 91 that are included in the sorting unit 16, based on information regarding the article Pa (e.g., the address, the size, the shape, the weight) obtained from the information obtaining unit 13. The main control device 17 conveys the conveyor cell 12*a*, on which the article Pa is loaded, towards the selected classification destination.

If the conveyor cell 12 on which the article Pa is loaded enters the sorting unit 16 that includes the chute 91 that corresponds to the classification destination of the article Pa, the main control device 17 instructs the cell control unit 47 of the conveyor cell 12 to discharge the article Pa to the chute 91. The cell control unit 47 of the conveyor cell 12 drives the cross belt 61 according to the control instruction from the main control device 17, and discharges the article Pa from the load surface A of the cross belt 61 to the chute 91.

According to the above-described embodiment, the article sorting apparatus includes the positioning devices 15 that are located opposite the loading device 14 with respect to the conveyance path 11. Therefore, it is possible to stabilize the position and the orientation of an article P when the article P is loaded onto a conveyor cell 12 by the loading device 14. The positioning devices 15 each include the contact member 80 whose portion that is brought into contact with an article P moves in synchronization with the movement of the article P in the first conveyance direction D1. Therefore, it is possible to appropriately maintain the contact member 80 in the state of being in contact with the article P on the conveyor cell 12. The positioning devices 15 each include the driving unit 82 that drives the contact member 80 in the second conveyance direction D2. Therefore, it is possible to appropriately stop an article P with respect to the second conveyance direction D2, while bringing the article P, which is transferred from the loading device 14 to the conveyor cell 12, into contact with the contact member 80.

The article sorting apparatus according to the present embodiment includes the positioning device 15. Therefore, during the transfer of an article P from the loading device 14 to a conveyor cell 12, where the article P can be unstable depending on the center of gravity of the article P, the shape of the bottom surface of the article P, and the material of the article P, it is possible to prevent the article P from falling down or toppling, and stop the article P in a predetermined orientation at a predetermined position on the load surface A. Even if the weights of various kinds of articles P to be conveyed are not known and there is the possibility of the rising edge and the falling edge of the rotation speed of the motor 68 being steep for a light object and gentle for a heavy object, it is possible to prevent articles P from stopping at a position displaced from a predetermined position on the load surface A. Even if there is the risk of an article P sliding on the load surface A due to the inertia force being greater than the frictional force between the article P and the cross belt 61, for example, when the acceleration and the deceleration of the cross belt 61 driven by the motor 68 is rapid, it is possible to stabilize the stopping position of the article P on the load surface A and prevent the article P from falling down. Even if the height of an article P in the vertical direction is relatively high compared to the length of the article P in the second conveyance direction D2, and there is the risk of the article P toppling due to the moment of inertia during the deceleration of the cross belt 61, it is possible to prevent the article P from toppling due to the contact member 80 supporting the article P.

The driving unit 82 of the positioning device 15 determines the stopping position of the article Pa on the load surface A, and also generates deceleration torque for the article P in cooperation with the motor 68. Therefore, it is possible to prevent positional control by the motor 68 from being complicated, and the required output of the motor 68 from increasing. The driving unit 82 of the positioning device 15 omits the necessity for a servo motor, a high-precision encoder, or the like to realize precise positional control by the motor 68. It is possible to use a common DC motor or brushless motor as the motor 68, and to reduce the cost of the motor 68. Since the output of the motor 68 is reduced, it is possible to reduce the weight of the conveyor cells 12 and to reduce the power feed capacity of contactless power feeding to the motor 68, which leads to high efficiency in the whole article sorting apparatus 10.

The positioning device 15 is provided for each of the injectors 71, and the number of injectors 71 is smaller than the number of conveyor cells 12. Therefore, it is possible to improve the maintainability of the apparatus compared to the case where a mechanism for controlling the position of an article P is provided for each of the plurality of conveyor cells 12.

The positioning device 15 can precisely determine the stopping position of an article P on the load surface A substantially at the same time as the article P is transferred from the loading device 14 to the corresponding conveyor cell 12, and there is no need for a sensor or the like that performs optical positional detection to detect variations in the stopping position of the article P. There is no need for a centering mechanism or the like that corrects the stopping position of an article P according to the result of detection of variation in the stopping position of the article P using an optical sensor or the like.

The timing at which the main control device 17 starts driving the linkage mechanism 81 of the positioning device 15 is set to the timing at which the empty conveyor cell 12a is located at a predetermined position. Therefore, it is possible to prevent the linkage mechanism 81 and the contact member 80 from being brought into contact with articles P on conveyor cells 12 that are located upstream and downstream of the empty conveyor cell 12a.

The following describes modifications.

In the above-described embodiment, the contact member 80 is provided with a plurality of contact roller that are independent from each other (the first contact roller 80a, the second contact roller 80b, and the third contact roller 80c). However, the present invention is not limited to this configuration.

Figure 16:
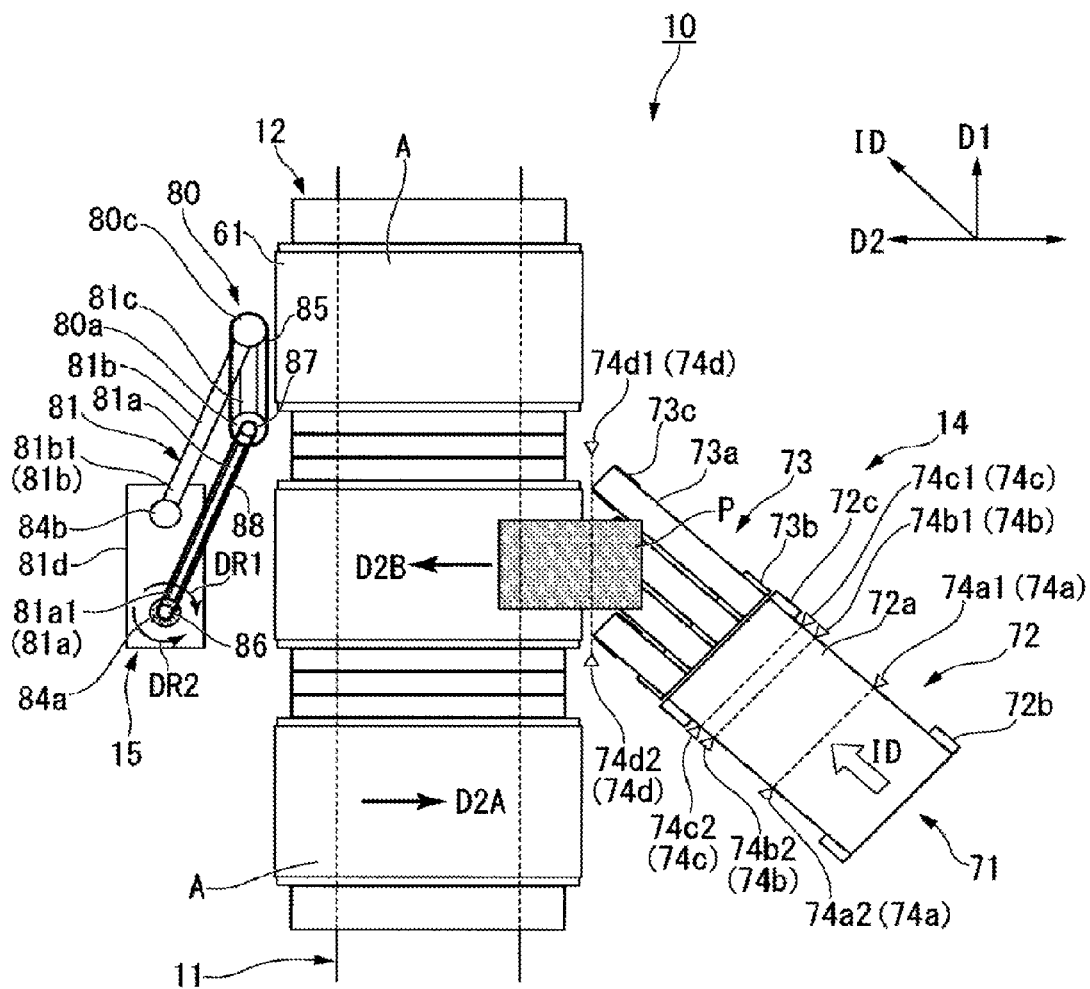
FIG. 16 is a plan view schematically showing configurations of a loading device, a positioning device, and some of the conveyor cells of an article sorting apparatus according to a first modification of the embodiment.
Figure 17:
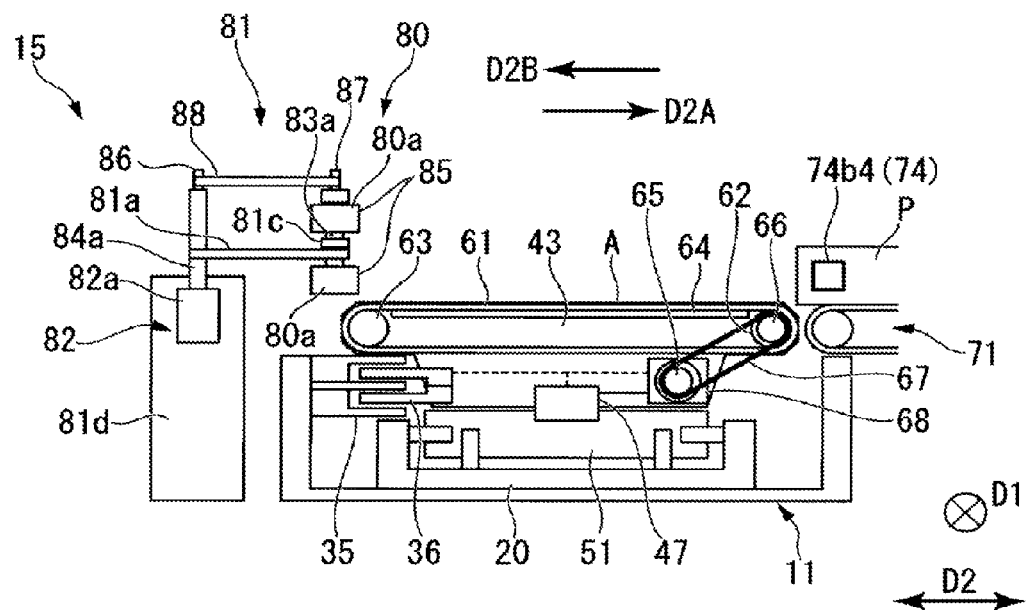
FIG. 17 is a cross-sectional view schematically showing configurations of the loading device, the positioning device, and a portion of the conveyor cell of the article sorting apparatus according to the first modification of the embodiment.

In the article sorting apparatus 10 according to a first modification of the embodiment, the contact member 80 may be provided with a belt 85, a chain, or the like that is wound around the outer circumferential surfaces of the plurality of contact rollers in order to rotate the plurality of contact rollers in synchronization. In the article sorting apparatus 10 according to the first modification, as shown in FIG. 16 and FIG. 17, the contact member 80 is provided with, for example, a belt 85 that is wound around the outer circumferential surfaces of the first contact roller 80a and the third contact roller 80c. The belt 85 rotates the first contact roller 80a and the third contact roller 80c in synchronization, and is brought into surface contact with a side surface of an article P loaded onto the cross belt 61 of a conveyor cell 12.

In the above-described embodiment, the contact member 80 is provided with at least one contact roller that is rotated by frictional force that is generated between the contact roller and an article P when the contact roller is brought into contact with the article P moving in the first conveyance direction D1. However, the present invention is not limited to such a configuration.

In the article sorting apparatus 10 according to the first modification of the embodiment, the contact member 80 may be provided with a roller driving unit that drives to rotate at least one contact roller. In the article sorting apparatus 10 according to the first modification, the contact member 80 is provided with a roller driving unit that includes, for example, a first pulley 86, a second pulley 87, and a transmission belt 88. The first pulley 86 is fixed to the rotation shaft 84a of the driving link 81a. The second pulley 87 is fixed to the rotation shaft 83a of the first contact roller 80a. The transmission belt 88 is wound around the first pulley 86 and the second pulley 87. The transmission belt 88 transmits the rotational driving force of the driving unit 82 to the first contact roller 80a at a predetermined reduction ratio corresponding to the first pulley 86 and the second pulley 87.

The predetermined reduction ratio is, for example, a reduction ratio that substantially equalizes the circumferential speed of the first contact roller 80a with the conveyance speed V of an article P in the first conveyance direction D1. Consequently, even when an article P that is in contact with the first contact roller 80a is conveyed in the first conveyance direction D1, it is possible to prevent the rotational resistance of the first contact roller 80a from acting against the article P, and it is possible to smoothly convey the article P.

Note that the roller driving unit may transmit the drive force of a driving unit other than the driving unit 82 to the contact roller.

In the above-described embodiment, the driving unit 82 of the positioning device 15 is provided with an actuator 82a of a rotation type, such as a motor. However, the present invention is not limited to such a configuration.

Figure 19:
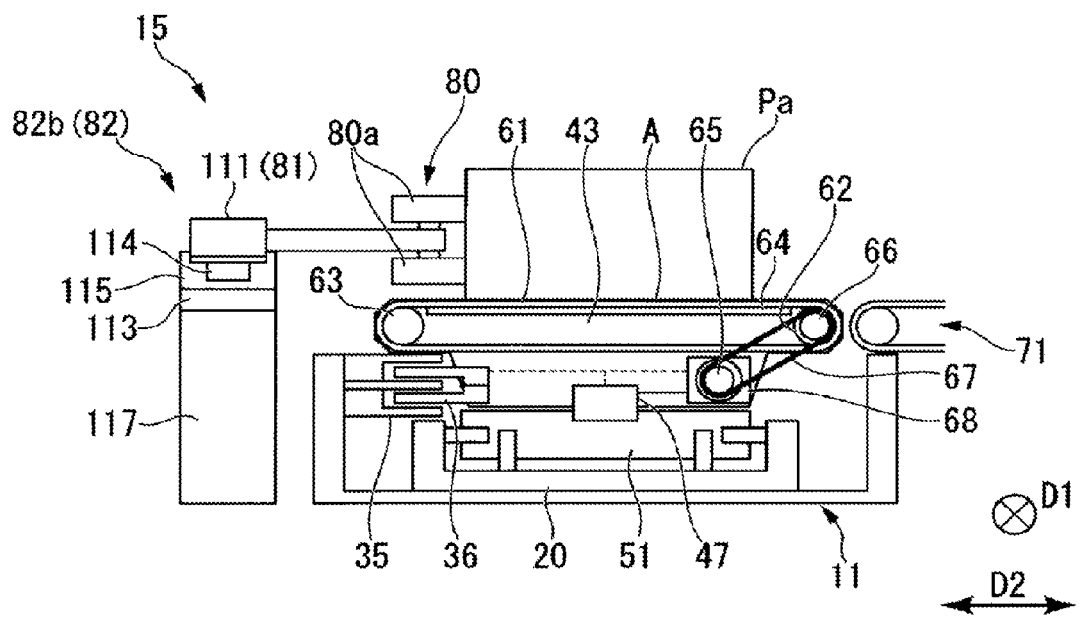
FIG. 19 is a cross-sectional view schematically showing configurations of the loading device, the positioning device, and a portion of the conveyor cell of the article sorting apparatus according to the second modification of the embodiment.
Figure 18:
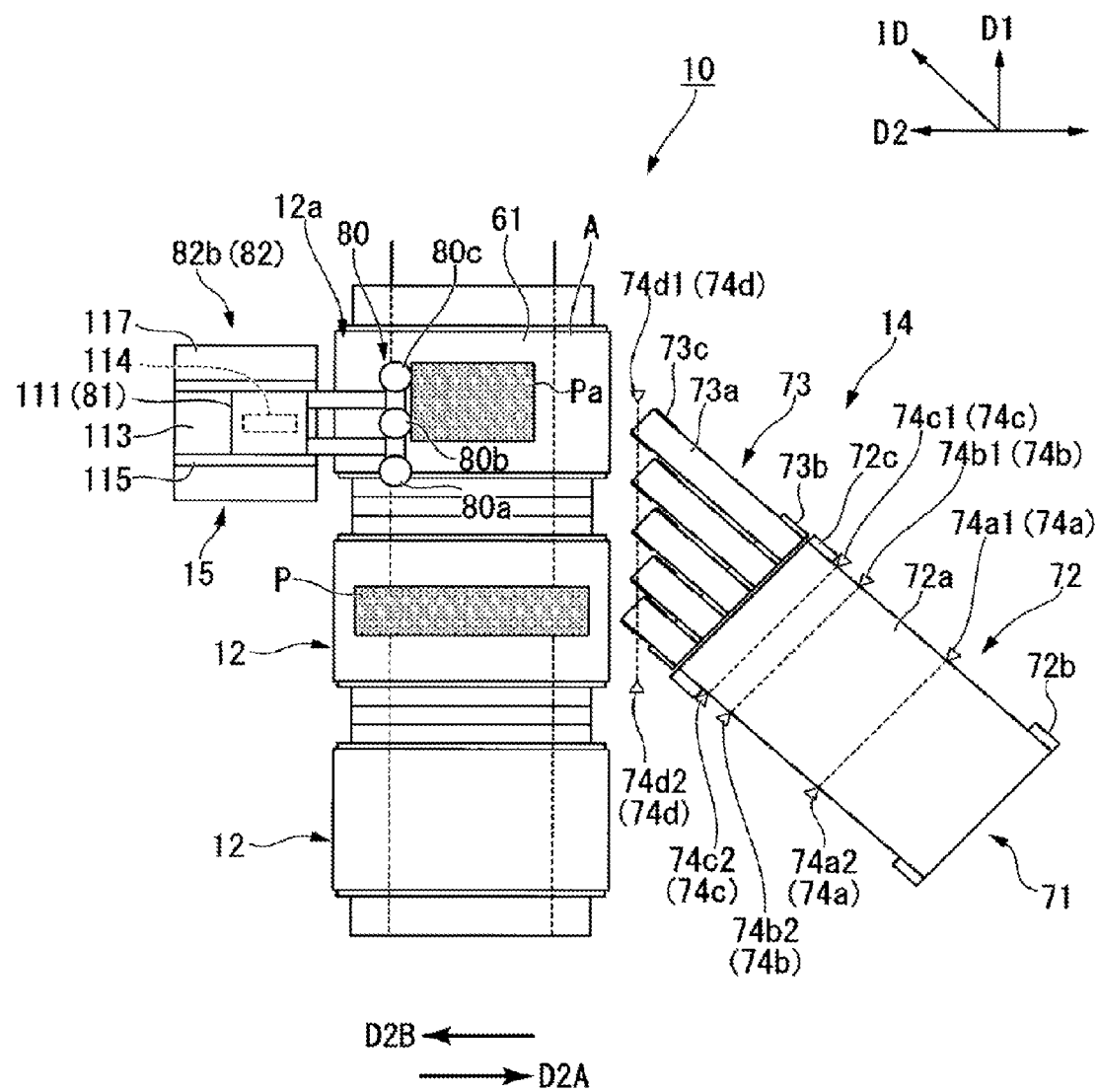
FIG. 18 is a plan view schematically showing configurations of a loading device, a positioning device, and some of the conveyor cells of an article sorting apparatus according to a second modification of the embodiment.

In an article sorting apparatus 10 according to a second modification of the embodiment, the driving unit 82 of the positioning device 15 may be provided with an actuator 82b of a linear motion type that linearly drives the contact member 80 in the second conveyance direction D2. In the article sorting apparatus 10 according to the second modification, the driving unit 82 of the positioning device 15 is provided with, for example, the actuator 82b such as linear synchronous motor. In the article sorting apparatus 10 according to the second modification, as shown in FIGS. 18 and 19, the contact member 80 of the positioning device 15 is provided with at least one contact roller, for example, the first contact roller 80a, the second contact roller 80b, and the third contact roller 80c. The linkage mechanism 81 of the positioning device 15 is provided with a linear motion link 111. The driving unit 82 of the positioning device 15 is provided with, for example: a main body frame 117; and a magnet array 113, an electromagnetic coil 114, and a linear guide 115, which are provided in the main body frame 117.

The first contact roller 80a, the second contact roller 80b, and the third contact roller 80c are independent from each other and are rotatably supported by a front end portion of the linear motion link 111.

The linear motion link 111 is arranged to be freely movable along the linear guide 115 in the second conveyance direction D2 (i.e., in the first transfer direction D2A and the second transfer direction D2B). The magnet array 113 is located on the linear guide 115. The electromagnetic coil 114 is located on the linear motion link 111. The magnet array 113 and the electromagnetic coil 114 face each other.

In the second modification, the driving unit 82 of the positioning device 15 includes the actuator 82b that is composed of a linear synchronization motor, and therefore the driving unit 82 can move the contact member 80 in the second conveyance direction D2 by performing high-speed and high-precision straight movement. When the conveyor cell 12 moves in the first conveyance direction D1, an article Pa moves in the first conveyance direction D1 while the article Pa is being in contact with the contact rollers.

Note that in the above-described second modification, the driving unit 82 is not limited to a linear synchronous motor, and may be provided with the actuator 82b of another linear motion type, such as an air actuator or an electromagnetic solenoid.

Also, in the above-described second modification, the driving unit 82 may be provided with, instead of the actuator 82b of a linear motion type, the actuator 82a of a rotation type and a link cam mechanism that converts the rotational driving force of the actuator 82a of a rotation type into straight motion, for example.

In the above-described embodiment, the main control device 17 does not perform selective control that depends on the size of the article P. However, the positioning device 15 is not necessarily operated for every article P.

For example, a predetermined threshold may be provided regarding the sizes of the articles P, and the main control device 17 may perform control to bring the contact member 80 of the positioning device 15 into contact with an article P when the length of the article P in the second conveyance direction D2, for example, is greater than or equal to the predetermined threshold.

For example, when an article P is large, it is likely that the article P is a heavy object. When an article P is a heavy object, the load on the motor 68 during deceleration is large, and the effect of the positioning device 15 reducing the load is remarkable. On the other hand, when the weight of an article P is small compared to its size, the contact pressure of the article P and the cross belt 61 is small, and the article P is likely to slide. Therefore, in this case, the effect of the positioning device 15 preventing the article P from sliding is remarkable.

Also, even when the length of an article P in the second conveyance direction D2 is smaller than the predetermined threshold, the main control device 17 may control the operation of the positioning device 15 if the size of the article P in the vertical direction is greater than or equal to a predetermined threshold, in order to prevent the article P from toppling.

In the above-described embodiment, the main control device 17 retracts the contact member 80 and the linkage mechanism 81 in the second transfer direction D2B after stopping the motor 68 and the driving unit 82. However, the present invention is not limited to such a configuration.

The main control device 17 may omit to retract the contact member 80 and the linkage mechanism 81 when, for example, no article P is loaded on the adjacent conveyor cell 12 on the upstream side, or the size of an article P loaded onto the adjacent conveyor cell 12 on the upstream side is smaller than a predetermined value. In the case of omitting to retract the contact member 80 and the linkage mechanism 81, the main control device 17 may place the contact member 80 at a predetermined position in advance as shown in State 4 in FIG. 12 for the article P that is to be subsequently transferred from the injectors 71 to the conveyor cell 12. Consequently, the main control device 17 can reduce the load on, and the power consumption of, the driving unit 82.

In the above-described embodiment, when the articles P on the conveyor cells 12 located on the front side and the rear side of the conveyor cell 12a have a significantly large size in the first conveyance direction D1 and the second conveyance direction D2, the main control device 17 may control the positioning device 15 in order to prevent the article Pa from falling down from the load surface A. When it is difficult to operate the contact member 80 and the linkage mechanism 81 while avoiding interference with the articles P on the conveyor cells 12 on the front side and the rear side, the main control device 17 may position the contact member 80 on an end portion of the load surface A in order to prevent the article Pa from falling down from the load surface A.

In the above-described embodiment, as shown in State 6 in FIG. 14, the main control device 17 simultaneously stops the motor 68 driving the cross belt 61 and the driving unit 82 driving the driving link 81a. However, the present invention is not limited to such a configuration.

For example, the main control device 17 may correct the orientation of the article Pa by continuously driving the cross belt 61 using the motor 68 while stopping the driving unit 82 driving the driving link 81a and holding the contact member 80 at a fixed position. For example, the main control device 17 may correct the orientation of the article Pa that is inclined relative to the first conveyance direction D1 and the second conveyance direction D2 on the load surface A such that the article Pa will be parallel to the first conveyance direction D1 and the second conveyance direction D2.

Consequently, the main control device 17 can prevent the article Pa from being conveyed to the sorting unit 16 in an inappropriate orientation.

In the above-described embodiment, a predetermined torque limit may be set to the main control device 17 in order to prevent excessive load from being applied to the driving unit 82 of the positioning device 15. In the case of bringing the contact member 80 into contact with the article Pa using the drive force of the driving unit 82, the main control device 17 may stop the driving unit 82 if a torque that is greater than or equal to a predetermined torque limit is applied to the driving unit 82.

In the above-described embodiment, the number and the shape of the contact rollers included in the contact member 80 of the positioning device 15 may be determined according to the need.

For example, the contact link 81c of the contact member 80 may have a great number of contact rollers such that a flat plane is formed by the outer circumferential surfaces of the great number of contact rollers.

The contact link 81c of the contact member 80 may have a single large-diameter contact roller, for example.

In the above-described embodiment, the linkage mechanism 81 of the positioning device 15 is parallel links. However the present invention is not limited to this configuration.

In the linkage mechanism 81 of the positioning device 15, the driven link 81b and the contact link 81c, for example, may be omitted. The positioning device 15 may be configured with: the driving link 81a; the driving unit 82 that drives to rotate the first end portion 81a1 of the driving link 81a; and the contact member 80 (e.g., a single contact roller) that is provided on the second end portion 81a2 of the driving link 81a, for example.

In the above-described embodiment, the driving link 81a, the driven link 81b, and the contact link 81c that constitute parallel links each has a straight rod shape. However, the present invention is not limited to such a configuration.

The driving link 81a, the driven link 81b, the contact link 81c, and the main body frame 81d may each have a curved shape, depending on the layout of the surrounding structure, for example. Therefore, it is possible to form the linkage mechanism 81 in a shape that is suited to avoid mechanical interference with the surrounding structure, articles P on the conveyor cells 12 on the upstream side and the downstream side of the conveyor cell 12a, and so on.

In the above-described embodiment, the conveyance path 11 has the configuration shown in FIG. 1. However, the present invention is not limited to such a configuration.

In a modification of the embodiment, the loading device 14, the positioning device 15, and the sorting unit 16 may be located in a single area or a plurality of areas along the conveyance path 11. The number of curves, the orientation, and the shape of the conveyance path 11 may be freely determined. Also, the conveyance path 11 may have an ascending slope and a descending slope as appropriate.

In the above-described embodiment, the injectors 71 and the positioning devices 15 have a one-to-one correspondence. However, the injectors 71 and the positioning devices 15 are not limited to such a configuration. Positioning devices that face particular injectors 71 may be provided instead of the positioning devices 15 that respectively face all the injectors 71.

In the above-described embodiment, the conveyance path 11 and the plurality of conveyor cells 12 are provided with a linear synchronous motor 31. However, the present invention is not limited to such a configuration, and the conveyance path 11 and the plurality of conveyor cells 12 may be provided with a linear induction motor.

Also, each conveyor cell 12 may be provided with a driving wheel and a motor that rotates the driving wheel, instead of the linear synchronous motor 31, and travel along the conveyance path 11 using the motor as a driving source for travelling.

Alternatively, each conveyor cell 12 may be conveyed along the conveyance path 11 by using a transmission mechanism that mechanically transmits driving force, instead of the linear synchronous motor 31. For example, a configuration may be adopted in which the chassis 51 of the chassis portion 41 has a flat plate that extends vertically downward, an end portion of the flat plate is sandwiched between a pair of rollers that are rotated by a driving motor from both sides in the thickness direction, and thus driving force in the first conveyance direction D1 is obtained.

In the above-described embodiment, the contactless power feeder unit 34 is provided along the entire length of the conveyance path 11. However, the present invention is not limited to such a configuration, and the contactless power feeder unit 34 may be provided along a portion of the conveyance path 11.

The contactless power feeder unit 34 may be provided at least near the loading device 14 and near the sorting unit 16.

In the above-described embodiment, adjacent conveyor cells 12 may be connected by a cable that transmits power fed from the contactless power feeder unit 34 or a control signal.

In the above-described embodiment, each conveyor cell 12 may be provided with: an AC/DC converter that converts alternating current to direct current with respect to power fed from the contactless power feeder unit 34; a voltage converter that steps up and down voltage; an accumulator for rectifying current; and a capacitor and a battery for accumulating power, for example.

In the above-described embodiment, the contactless power feeder unit 34 performs contactless power feeding from the conveyance path 11 to the conveyor cells 12 by using electromagnetic induction. However, the present invention is not limited to such a configuration.

The contactless power feeder unit 34 may perform contactless power feeding from the conveyance path 11 to the conveyor cells 12 by using radio wave transmission/reception, magnetic field resonance, or magnetic field coupling, for example.

In the above-described embodiment, conveyor cells 12 that are adjacent to each other in the first conveyance direction D1 are coupled to each other by their respective coupling mechanisms 53. However, the present invention is not limited to such a configuration. The plurality of conveyor cells 12 may be separated from one another.

In the above-described embodiment, the motor 68 is a DC motor or a brushless motor. However, the present invention is not limited to such a configuration. For example, the motor 68 may be a servo motor, a stepping motor, or the like.

In the above-described embodiment, the driving unit 82 is a servo motor. However, the present invention is not limited to such a configuration. For example, the driving unit 82 may be a DC motor, a brushless motor, a stepping motor, or the like. Also, the driving unit 82 is not limited to a motor, and may be an electromagnetic solenoid.

In the above-described embodiment, the cross belt mechanism 42 may be provided with a tension adjustment mechanism that adjusts the tension of the cross belt 61 by adjusting the distance between the driving roller 62 and the driven roller 63.

Alternatively, the cross belt mechanism 42 may be provided with a tension roller that adjusts the tension of the cross belt 61, in addition to the driving roller 62 and the driven roller 63.

In the above-described embodiment, each of the chutes 91 of the sorting unit 16 may be provided with a conveyance unit such as a conveyor belt that operates to draw an article P discharged from the cross belt 61 of a conveyor cell 12.

According to the above-described embodiment, the article sorting apparatus includes the positioning devices 15 that are located opposite the loading device 14 with respect to the conveyance path 11. Therefore, it is possible to stabilize the position and the orientation of an article P when the article P is loaded onto a conveyor cell 12 by the loading device 14. The positioning devices 15 each include a contact member 80 whose portion that is brought into contact with an article P moves in synchronization with the movement of the article P in the first conveyance direction D1. Therefore, it is possible to appropriately maintain the contact member 80 in the state of being in contact with the article P on the conveyor cell 12. The positioning devices 15 each include the driving unit 82 that drives the contact member 80 in the second conveyance direction D2. Therefore, it is possible to appropriately stop an article P with respect to the second conveyance direction D2, while bringing the article P, which is transferred from the loading device 14 to the conveyor cell 12, into contact with the contact member 80.

While certain embodiment and modifications have been described, these embodiment and modifications have been presented by way of example only, and are not intended to limit the scope of the inventions. Indeed, the novel embodiment and modifications described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article sorting apparatus comprising:
a conveyance path;
a conveyor cell configured to move along the conveyance path in a first conveyance direction, and to convey an article loaded thereon in a second conveyance direction that intersects the first conveyance direction;
a loading device configured to load the article onto the conveyor cell;
a positioning device located opposite the loading device with respect to the conveyance path, the positioning device including: a contact member configured to be brought into contact with the article loaded onto the conveyor cell by the loading device, and whose contact portion that comes in contact with the article being configured to move in synchronization with movement of the article in the first conveyance direction; and a driving unit configured to drive the contact member in the second conveyance direction;
a sorting unit configured to receive the article conveyed by the conveyor cell; and
a control device configured to control conveyance of the article in the second conveyance direction by the conveyor cell when the loading device has loaded the article onto the conveyor cell, and to bring the contact member into contact with the article loaded onto the conveyor cell by driving the contact member in the second conveyance direction, using the driving unit.

2. The article sorting apparatus according to claim 1, wherein the contact member includes at least one roller configured to rotate in synchronization with the movement of the article in the first conveyance direction.

3. The article sorting apparatus according to claim 1, wherein the contact member includes: rollers; and a belt wound around outer circumferential surfaces of the rollers, and the belt is configured to move in synchronization with the movement of the article in the first conveyance direction.

4. The article sorting apparatus according to claim 3, further comprising:
a roller driving unit configured to rotate the rollers.

5. The article sorting apparatus according to claim 1, wherein
the positioning device is provided with a linkage mechanism that includes: a first end portion having a rotation shaft extending in a vertical direction, and a second end portion provided with the contact member,
the driving unit includes an actuator of a rotation type configured to rotate the linkage mechanism about the rotation shaft, and
the control device is configured to bring the contact member into contact with the article by rotating the linkage mechanism about the rotation shaft, using the actuator.

6. The article sorting apparatus according to claim 5, wherein
the linkage mechanism includes a first link, a second link, a third link, and a fourth link that constitute parallel links,
a first end portion of the first link has the rotation shaft that is rotatably supported by the forth link, and a second end portion of the first link is rotatably connected to a first end portion of the third link,
a first end portion of the second link has a second rotation shaft that is rotatably supported by the fourth link, and a second end portion of the second link is rotatably connected to a second end portion of the third link,
the fourth link sets the rotation shaft of the first link and the second rotation shaft of the second link in parallel to the first conveyance direction,
the third link is provided with the contact member, and is configured to move in the second conveyance direction along with rotation of the first link, while being maintained in parallel to the first conveyance direction, and
the control device is configured to bring the contact member into contact with the article by rotating the first link about the rotation shaft, using the actuator.

7. The article sorting apparatus according to claim 1, wherein
the driving unit is provided with an actuator of a linear motion type configured to linearly drive the contact member in the second conveyance direction, and
the control device is configured to bring the contact member into contact with the article by linearly driving the contact member in the second conveyance direction, using the actuator.

8. The article sorting apparatus according to claim 1, wherein the control device is configured to drive the contact member in the second conveyance direction in synchronization with the movement of the article conveyed by the conveyor cell, and to thereafter stop the contact member that is in contact with the article.

9. The article sorting apparatus according to claim 1, wherein the conveyor cell includes: a chassis portion; a cross belt mechanism; and a frame portion configured to fix the chassis portion and the cross belt mechanism to each other, the chassis portion is configured to move along the conveyance path, the cross belt mechanism includes a cross belt onto which the article is loaded, and the cross belt moves in the second conveyance direction.

10. The article sorting apparatus according to claim 1, wherein the loading device is provided with an injector, the injector includes a first conveyance portion and a second conveyance portion that are arranged along a direction that intersects the first conveyance direction of the conveyance path at a predetermined acute angle, and one end of the second conveyance portion faces the conveyance path.

11. The article sorting apparatus according to claim 1, wherein the sorting unit includes a plurality of chutes arranged along the first conveyance direction of the conveyance path.

* * * * *